US009088963B2

(12) United States Patent
Ravishankar et al.

(10) Patent No.: US 9,088,963 B2
(45) Date of Patent: Jul. 21, 2015

(54) SYSTEM AND METHOD FOR EFFICIENT USE OF RADIO RESOURCES IN MULTICAST SERVICES IN MOBILE WIRELESS COMMUNICATIONS SYSTEMS

(71) Applicant: Hughes Network Systems, LLC, Germantown, MD (US)

(72) Inventors: Channasandra Ravishankar, Germantown, MD (US); Deepak Arur, Mclean, VA (US); Nassir Benammar, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 240 days.

(21) Appl. No.: 13/900,501

(22) Filed: May 22, 2013

(65) Prior Publication Data
US 2013/0315125 A1 Nov. 28, 2013

Related U.S. Application Data

(60) Provisional application No. 61/650,443, filed on May 22, 2012.

(51) Int. Cl.
| | |
|---|---|
| *H04W 4/06* | (2009.01) |
| *H04L 12/28* | (2006.01) |
| *H04W 72/04* | (2009.01) |
| *H04W 72/00* | (2009.01) |
| *H04L 12/18* | (2006.01) |
| *H04W 76/00* | (2009.01) |

(Continued)

(52) U.S. Cl.
CPC ........... *H04W 72/005* (2013.01); *H04L 12/189* (2013.01); *H04L 12/1836* (2013.01); *H04W 76/002* (2013.01); *H04W 36/026* (2013.01); *H04W 36/14* (2013.01)

(58) Field of Classification Search
USPC .................... 370/312, 392, 390, 432
See application file for complete search history.

(56) References Cited

U.S. PATENT DOCUMENTS

| | | | |
|---|---|---|---|
| 6,721,272 B1 | 4/2004 | Parnafes et al. | |
| 7,779,461 B1 * | 8/2010 | Liu et al. ................. | 726/15 |
| 2003/0026240 A1 | 2/2003 | Eyuboglu et al. | |

(Continued)

OTHER PUBLICATIONS

PCT/US2013/042320 International Search Report and Written Opinion, dated Aug. 1, 2013.

*Primary Examiner* — Andrew Lee
(74) *Attorney, Agent, or Firm* — Potomac Technology Law, LLC

(57) ABSTRACT

Approaches for resource efficient multicast communications in mobile satellite systems are provided. A wireless gateway is configured to encapsulate multicast signaling messages received from participating remote terminals. The encapsulation is compatible with the core network of the system, whereby the signaling is passed through the core network undetected. The signaling is received by a multicast gateway, and provides necessary IP and port addressing information for the multicast gateway to encapsulate the multicast session data in a manner compatible with the core network. Upon receiving multicast session data from a multicast server, the multicast gateway replicates and encapsulates each data packet with IP and port addressing for each participating remote terminal, which is also passed through the core network undetected. The wireless gateway receives the replicated data packets, and based on the encapsulation information, transmits each data packet via a broadcast transmission to each cell wherein participating terminals are located.

26 Claims, 16 Drawing Sheets

(51) Int. Cl.
*H04W 36/14* (2009.01)
*H04W 36/02* (2009.01)

(56) References Cited

U.S. PATENT DOCUMENTS

| | | |
|---|---|---|
| 2003/0073453 A1 | 4/2003 | Basilier |
| 2003/0093691 A1 | 5/2003 | Simon et al. |
| 2004/0131075 A1 | 7/2004 | Sinnarajah et al. |
| 2005/0091315 A1* | 4/2005 | Hurtta .......................... 709/204 |
| 2006/0034278 A1 | 2/2006 | Hundscheidt et al. |
| 2006/0166699 A1* | 7/2006 | Aghvami et al. .......... 455/552.1 |
| 2006/0221962 A1* | 10/2006 | Previdi et al. ................ 370/390 |
| 2007/0091827 A1* | 4/2007 | Boers et al. ................... 370/255 |
| 2007/0168523 A1* | 7/2007 | Jiang et al. .................... 709/228 |
| 2007/0286137 A1 | 12/2007 | Narasimhan et al. |
| 2008/0123645 A1* | 5/2008 | Pichna et al. ................. 370/390 |
| 2008/0175238 A1* | 7/2008 | Venkatachalam ............. 370/390 |
| 2008/0239972 A1* | 10/2008 | Omar ............................ 370/250 |
| 2009/0080355 A1 | 3/2009 | Song |
| 2011/0044232 A1* | 2/2011 | Miettinen et al. ............. 370/312 |
| 2011/0142042 A1 | 6/2011 | Field |
| 2013/0041934 A1* | 2/2013 | Annamalaisami et al. ... 709/203 |
| 2013/0188641 A1* | 7/2013 | Lee, Yiu Leung ............ 370/392 |

\* cited by examiner

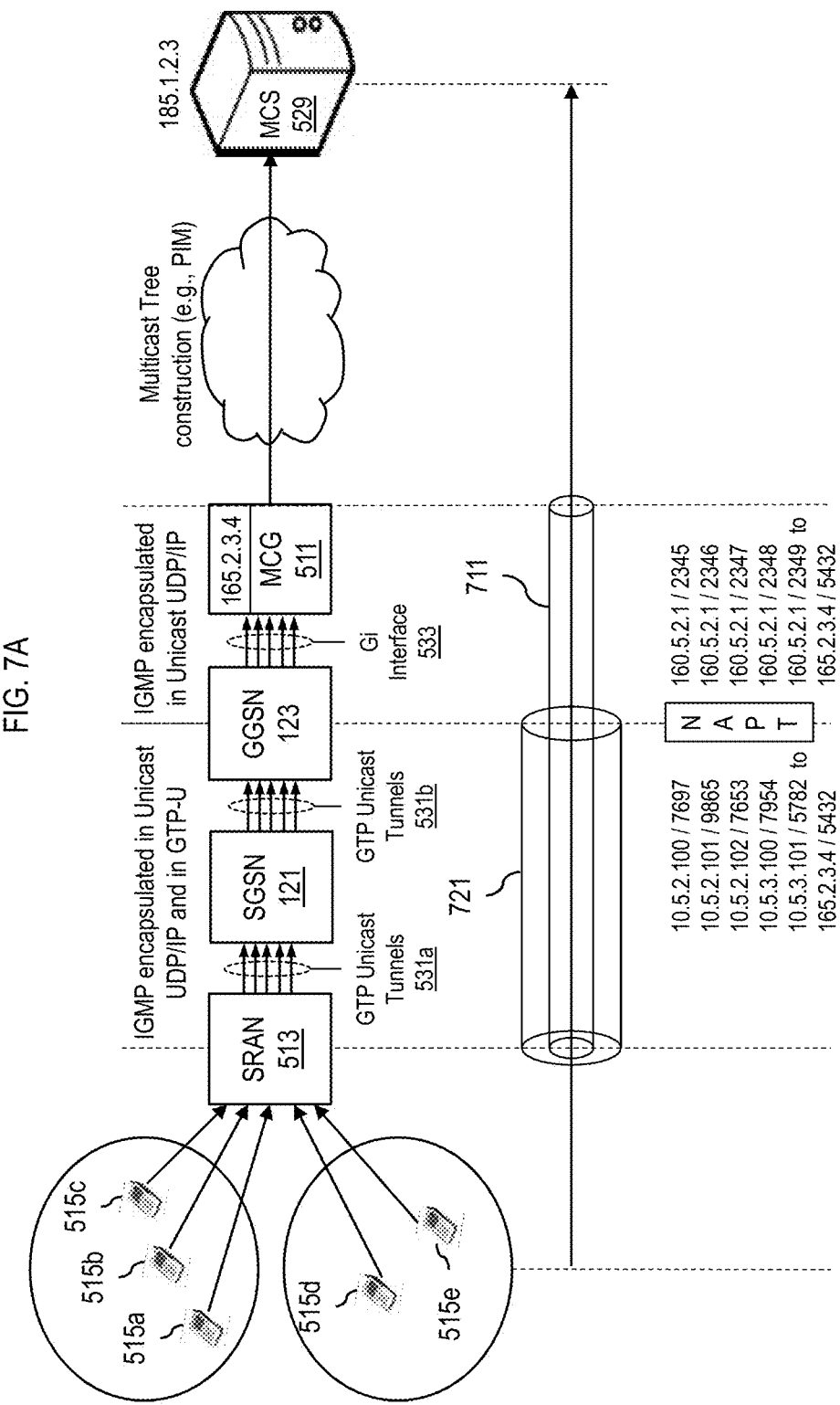

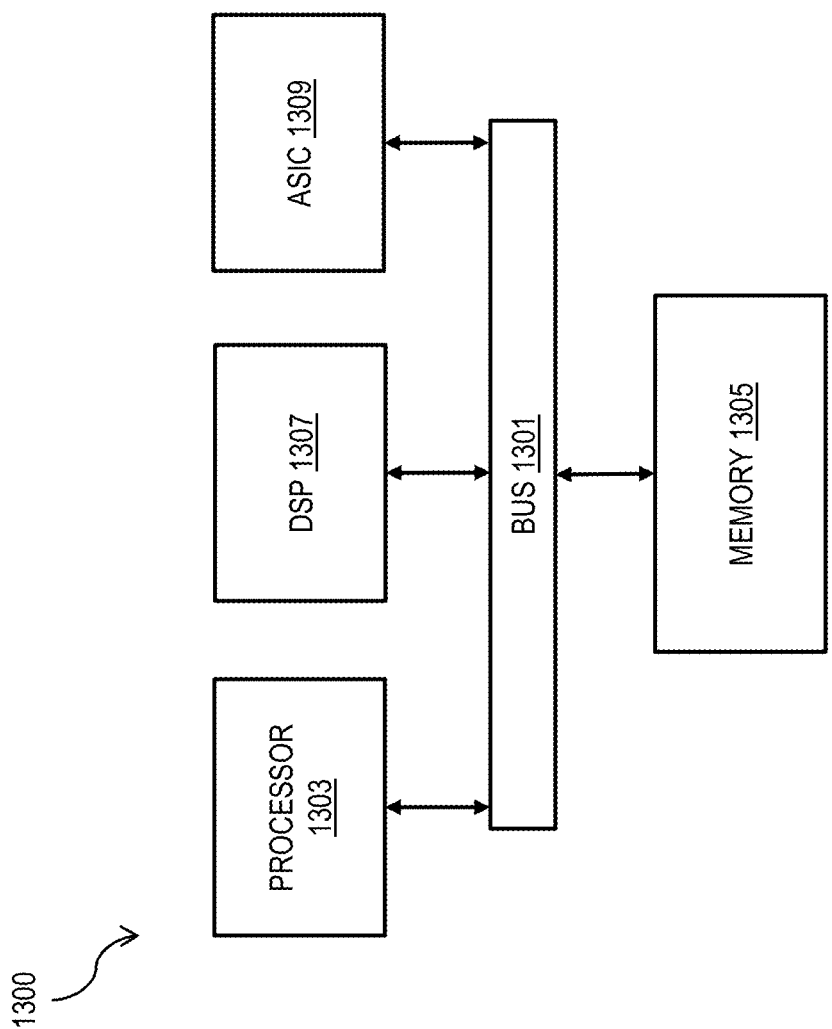

SYSTEM AND METHOD FOR EFFICIENT USE OF RADIO RESOURCES IN MULTICAST SERVICES IN MOBILE WIRELESS COMMUNICATIONS SYSTEMS

RELATED APPLICATIONS

This application claims the benefit of the earlier filing date under 35 U.S.C. §119(e) of U.S. Provisional Application Ser. No. 61/650,443 (filed 22 May 2012), the entirety of which is incorporated herein by reference.

BACKGROUND

Terrestrial communications systems continue to provide higher and higher speed multimedia (e.g., voice, data, video, images, etc.) services to end-users. Such services (e.g., Third Generation (3G) and Fourth Generation (4G) services) can also accommodate differentiated quality of service (QoS) across various applications. To facilitate this, terrestrial architectures are moving towards an end-to-end all-Internet Protocol (IP) architecture that unifies all services, including voice, over the IP bearer. In parallel, mobile satellite systems (MSS) are being designed to complement and/or coexist with terrestrial coverage depending on spectrum sharing rules and operator choice. With the advances in processing power of desktop computers, the average user has grown accustomed to sophisticated applications (e.g., streaming video, radio broadcasts, video games, etc.), which place tremendous strain on network resources. Internet services, as well as other IP services, rely on protocols and networking architectures that offer great flexibility and robustness; however, such infrastructure may be inefficient in transporting IP traffic, which can result in large user response time, particularly if the traffic has to traverse an intermediary network with a relatively large latency (e.g., a satellite network). To promote greater adoption of data communications services, the telecommunications industry, from manufacturers to service providers, has agreed at great expense and effort to develop standards for communications protocols that underlie the various services and features.

Satellite systems, however, pose unique design challenges over terrestrial systems. That is, mobile satellite systems have different attributes that make terrestrial designs either not applicable or inefficient for satellite systems. For example, satellite systems are characterized by long delays (as long as 260 ms one-way) between a user terminal device and a base station compared to the relatively shorter delays (e.g., millisecond or less) in terrestrial cellular systems—which implies that protocols on the satellite links have to be enhanced to minimize impact of long propagation delays. Additionally, satellite links typically have smaller link margins than terrestrial links for a given user-terminal power amplifier and antenna characteristics; this implies that higher spectral efficiency and power efficiency are needed in satellite links. Moreover, the satellite transmission or channel resources represent limited resources, where the deployment of additional transmission resources is significantly more expensive, difficult and time consuming as compared with terrestrial radio resources. Accordingly, the transmission resources of a satellite system must be used efficiently to maximize the available bandwidth, in order to provide the required quality of service for the extensive and diverse assortment of service applications available to the mobile user, and to maximize the number of potential users in a system without adversely affecting the quality of service.

An IP Multicast service is a point to multipoint service, where hosts or users join an IP multicast session by using host-router protocols, such as Internet Group Management Protocol (IGMP). Traditional wireless IP networks are typically deployed based on unicast architectures and protocols. Accordingly, under a unicast framework or infrastructure, for a multicast session, each IP packet of the multicast session must be transmitted individually to each participating host via a wireless link (e.g., in a unicast or point to point manner). Such a multicast session, therefore, would utilize as many radio resources as there are hosts participating in the multicast session, which inefficiently consumes extensive radio resources for a multicast session.

What is needed, therefore, is an approach for efficient use of radio and spectral resources for multicast services in terrestrial wireless and satellite mobile communications systems. What is further needed is an approach for efficient use of radio resources for secure transmission of multicast data streams in a mobile satellite system. There is a further need for a process that facilitates optimal designation of physical layer attributes (e.g., modulation, coding, power, etc.), in a manner providing for further spectral efficiency in the use of satellite or radio resources.

SOME EXEMPLARY EMBODIMENTS

The present invention advantageously addresses the foregoing requirements and needs, as well as others, by providing system architectures and methods for the provision of secure IP multicast services in terrestrial wireless and satellite mobile communications systems, which achieve improved radio and spectral resource efficiency.

In accordance with exemplary embodiments, the radio access network (RAN) of a mobile wireless communications system employs protocols for tracking multicast session host participants on a per cell basis, for encapsulation of multicast control plane messaging from terminal hosts, and for de-encapsulation of multicast data plane streams from a multicast content server (MCS). In accordance with exemplary embodiments, a multicast gateway (GGSN) is provided that employs protocols for de-encapsulation of multicast control plane messaging from terminal hosts, and for encapsulation of multicast data plane streams. By way of example, in accordance with such exemplary embodiments, the protocols of the MCG and RAN facilitate standard network address and port translation (NAPT) functions, standard multicast tree construction, support of private IP addressing for hosts participating in a multicast session over a public IP network, and the broadcast of multicast data streams via a single radio transmission or satellite channel transmission resource to each cell in which one or more host participants reside. In accordance with further exemplary embodiments, security protocols are provided whereby a shared key for securing the data of a multicast session is provided to participating hosts over the wireless channels in a secure unicast manner. In accordance with additional exemplary embodiments, protocols are provided for optimal designation of physical layer attributes for the wireless transmission channels of a multicast session based on periodic channel quality feedback from the participating hosts. Accordingly, these and other aspects of exemplary embodiments of the present invention facilitate the efficient utilization of radio and spectral resources for multicast services in terrestrial wireless or satellite mobile communications systems.

According to an example embodiment, a method comprises receiving, by a wireless gateway of a communications network, a message packet from a host terminal, wherein the message packet is destined for a multicast control node of the communications network, and the message packet includes a multicast session identifier that identifies a multicast session being joined by the host terminal. The message packet is encapsulated as a transport layer unicast tunnel packet, including at least one source identifier of the host terminal and at least one destination identifier of the multicast control node. The transport layer unicast tunnel packet is transmitted to the multicast control node, wherein the transport layer unicast tunnel packet is configured to direct the multicast control node to bind to a multicast distribution tree associated with the multicast session. According to a further example, the transport layer unicast tunnel packet is encapsulated as a core network unicast tunnel packet in accordance with a core network tunneling protocol, and, instead of transmitting the transport layer unicast tunnel packet, the core network unicast tunnel packet is transmitted to the multicast control node via a core network of the communications network. According to a further example, a gateway node of the core network receives the core network unicast tunnel packet. The core network unicast tunnel packet encapsulation is de-encapsulated, and the transport layer unicast tunnel packet encapsulation is translated by converting the at least one source identifier of the respective host terminal to corresponding translated network identifiers. The gateway node transmits the translated transport layer unicast tunnel packet to the multicast control node. According to a further example, the multicast control node receives the translated transport layer unicast tunnel packet, de-encapsulates the translated transport layer unicast tunnel packet encapsulation, and transmits the de-encapsulated packet to a multicast server. By way of example, the encapsulation of the message packet as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node; and the translation of the transport layer unicast tunnel packet encapsulation comprises converting the private IP address of the host terminal to a public IP address of an operator controlling the multicast session, and converting the assigned TCP/UDP port to a modified source port assigned to the respective host terminal for the multicast session.

According to a further example embodiment, a method comprises receiving, by a multicast control node of a communications network, a multicast control message packet that originated from a host terminal, wherein the multicast control message packet includes a multicast session identifier that identifies a multicast session being joined by the host terminal, and wherein the multicast control message is encapsulated as a transport layer unicast tunnel packet, including at least one source identifier of the host terminal and at least one destination identifier of the multicast control node. Upon receipt of the transport layer tunnel packet by the multicast control node, binding the multicast control node to a multicast distribution tree associated with the multicast session. By way of example, the encapsulation of the multicast control message as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

According to a further example embodiment, a method comprises receiving, by a multicast control node of a communications network, a multicast data packet of a multicast data stream, wherein the multicast data packet includes session data of a multicast session, at least one source identifier of a multicast server and at least one destination identifier of the multicast session. The multicast data packet is replicated for transmission as an individual unicast transmission, via a core network of the communications network, to each of a plurality of host terminals participating in the multicast session. Each replication of the multicast data packet is encapsulated as a transport layer unicast tunnel packet, including at least one source identifier of the multicast control node and at least one destination identifier of a respective one of the host terminals participating in the multicast session. Each encapsulated replication packet is transmitted, via a core network of the communications network, for delivery to the respective host terminal. According to a further example, a gateway node of the core network receives the encapsulated replication packets. The transport layer unicast tunnel packet encapsulation of each of the received encapsulated replication packets is translated by converting the at least one destination identifier of the respective host terminal to corresponding translated network identifiers. Each translated transport layer unicast tunnel packet is encapsulated as a core network unicast tunnel packet in accordance with a core network tunneling protocol, and each core network unicast tunnel packet is transmitted, via a core network of the communications network, to a wireless gateway of the communications network for the delivery to the respective host terminal. According to a further example, the wireless gateway receives the core network unicast tunnel packets. The core network unicast tunnel packets are de-encapsulated to obtain the data packet of the multicast data stream, including the session data, the source identifiers of the multicast server and the destination identifiers of the multicast session, and the de-encapsulated multicast data packet is transmitted as a wireless broadcast transmission to each of a plurality of wireless coverage cells within which at least one of the host terminals participating in the multicast session is located. By way of example, the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each replication of the packet as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

According to a further example embodiment, a method comprises receiving, by a wireless gateway of a communications network, a plurality of encapsulated multicast data packets, wherein each of the multicast data packets comprises a replication of a data packet of a multicast data stream of a multicast session, including at least one source identifier of a multicast server and at least one destination identifier of an associated multicast session; and wherein each of the multicast data packets is encapsulated as a transport layer unicast tunnel packet, including at least one source identifier of a multicast control node of the communications network and at least one destination identifier of a respective one of a plurality of host terminals participating in the multicast session. The multicast data packets are de-encapsulated to obtain the data packet of the multicast data stream, including the session data, the source identifiers of the multicast server and the destination identifiers of the multicast session, and de-encapsulated multicast data packet is transmitted as a wireless broadcast transmission to each of a plurality of wireless coverage cells within which at least one of the host terminals participating in the multicast session is located. By way of example, the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each of the multicast data packets as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

According to a further example embodiment, an apparatus of a communications network comprises a receiver configured to receive wireless communications from remote terminals. The apparatus further comprises a processor configured to encapsulate a message packet received by the receiver from a host remote terminal, wherein the message packet is destined for a multicast control node of the communications network, and the message packet includes a multicast session identifier that identifies a multicast session being joined by the host remote terminal, and wherein the encapsulation of the message comprises encapsulation as a transport layer unicast tunnel packet, including at least one source identifier of the host terminal and at least one destination identifier of the multicast control node. The apparatus further comprises a transmitter configured to transmit the transport layer unicast tunnel packet to the multicast control node, wherein the transport layer unicast tunnel packet is configured to direct the multicast control node to bind to a multicast distribution tree associated with the multicast session. According to a further example, the processor is further configured to encapsulate the transport layer unicast tunnel packet as a core network unicast tunnel packet in accordance with a core network tunneling protocol, wherein, instead of the transport layer unicast tunnel packet, the transmitter is configured to transmit the core network unicast tunnel packet to the multicast control node via a core network of the communications network. By way of example, the encapsulation of the message packet as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

According to a further example embodiment, an apparatus of a communications network comprises a receiver configured to receive terrestrial communications from a core network of the communications network. The apparatus further comprises a processor configured to process a multicast control message packet received by the receiver and originating from a host remote terminal, wherein the multicast control message packet includes a multicast session identifier that identifies a multicast session being joined by the host terminal, and wherein the multicast control message is encapsulated as a transport layer unicast tunnel packet, including at least one source identifier of the host terminal and at least one destination identifier of the multicast control node. Further, based on the processing of the multicast control message packet, the processor is further configured to bind the apparatus to a multicast distribution tree associated with the multicast session. According to a further example, the processor is further configured to de-encapsulate the transport layer unicast tunnel packet encapsulation, and the apparatus further comprises a transmitter configured to transmit the de-encapsulated packet to a multicast server. By way of example, the encapsulation of the multicast control message as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

According to a further example embodiment, an apparatus of a communications network comprises a receiver configured to receive terrestrial communications destined for the communications network. The apparatus further comprises a processor configured to process a multicast data packet of a multicast data stream received by the receiver, wherein the multicast data packet includes session data of a multicast session, at least one source identifier of a multicast server and at least one destination identifier of the multicast session, wherein the processing of the multicast data packet comprises: replicating the data packet for transmission as an individual unicast transmission, via a core network of the communications network, to each of a plurality of host terminals participating in the multicast session; and encapsulating each replication of the packet as a transport layer unicast tunnel packet, including at least one source identifier of the multicast control node and at least one destination identifier of a respective one of the host terminals participating in the multicast session. The apparatus further comprises a transmitter configured to transmit each encapsulated replication packet, via a core network of the communications network, for delivery to the respective host terminal. By way of example, the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each replication of the packet as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

According to a further example embodiment, an apparatus of a communications network comprises a receiver configured to receive terrestrial communications from a core network of the communications network. The apparatus further comprises a processor configured to process a plurality of multicast data packets received by the receiver from the core network, wherein each of the multicast data packets comprises a replication of a data packet of a multicast data stream of a multicast session, including at least one source identifier of a multicast server and at least one destination identifier of an associated multicast session; and wherein each of the multicast data packets is encapsulated as a transport layer unicast tunnel packet, including at least one source identifier of a multicast control node of the communications network and at least one destination identifier of a respective one of a plurality of host terminals participating in the multicast session, wherein the processing of the multicast data packets comprises de-encapsulating the multicast data packets to obtain the data packet of the multicast data stream, including the session data, the source identifiers of the multicast server and the destination identifiers of the multicast session. The apparatus further comprises a wireless transmitter configured to transmit the de-encapsulated multicast data packet as a wireless broadcast transmission to each of a plurality of wireless coverage cells within which at least one of the host terminals participating in the multicast session is located. By way of example, the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each of the multicast data packets as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, and in which like reference numerals refer to similar elements, and wherein:

FIG. 7A illustrates example data flows of the IP multicast control plane for resource efficient IP multicast services, in accordance with an exemplary embodiment;

FIG. 13 illustrates a chip set 1300 in which embodiments of the invention may be implemented.

DETAILED DESCRIPTION

System architectures and methods for the provision of secure IP multicast services in terrestrial wireless and satellite mobile communications systems, which achieve improved radio and spectral resource efficiency, are provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although certain embodiments are discussed with respect to an Internet Protocol (IP)-based architecture, it is recognized by one of ordinary skill in the art that these embodiments have applicability to any type of packet based communications system and equivalent functional capabilities.

Figure 1:
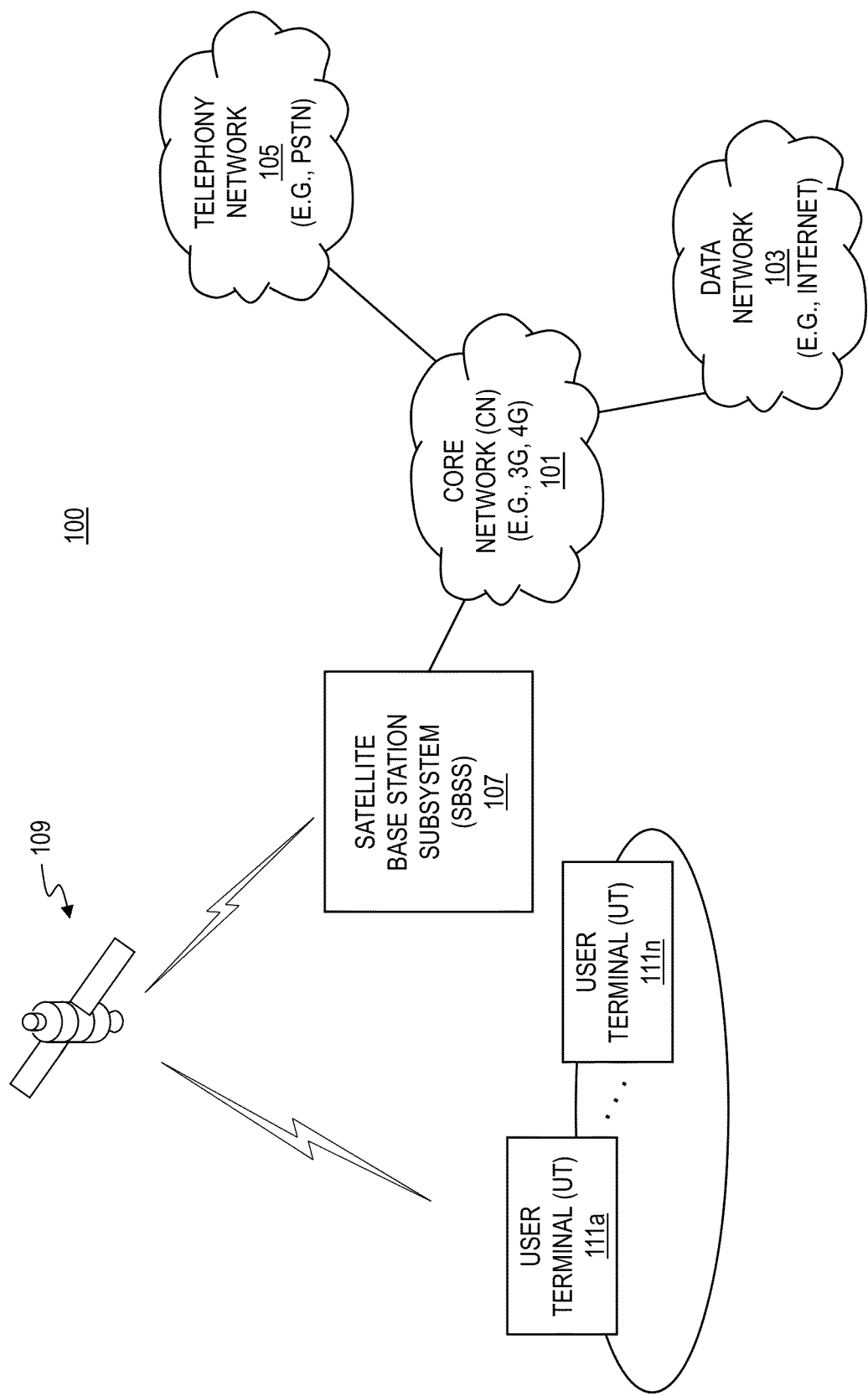
FIGS. 1 and 2 illustrate diagrams of communications systems capable of providing Internet Protocol (IP)-based communications sessions from a terrestrial (wireline or wireless) domain to a satellite domain, according to various exemplary embodiments.
Figure 2:
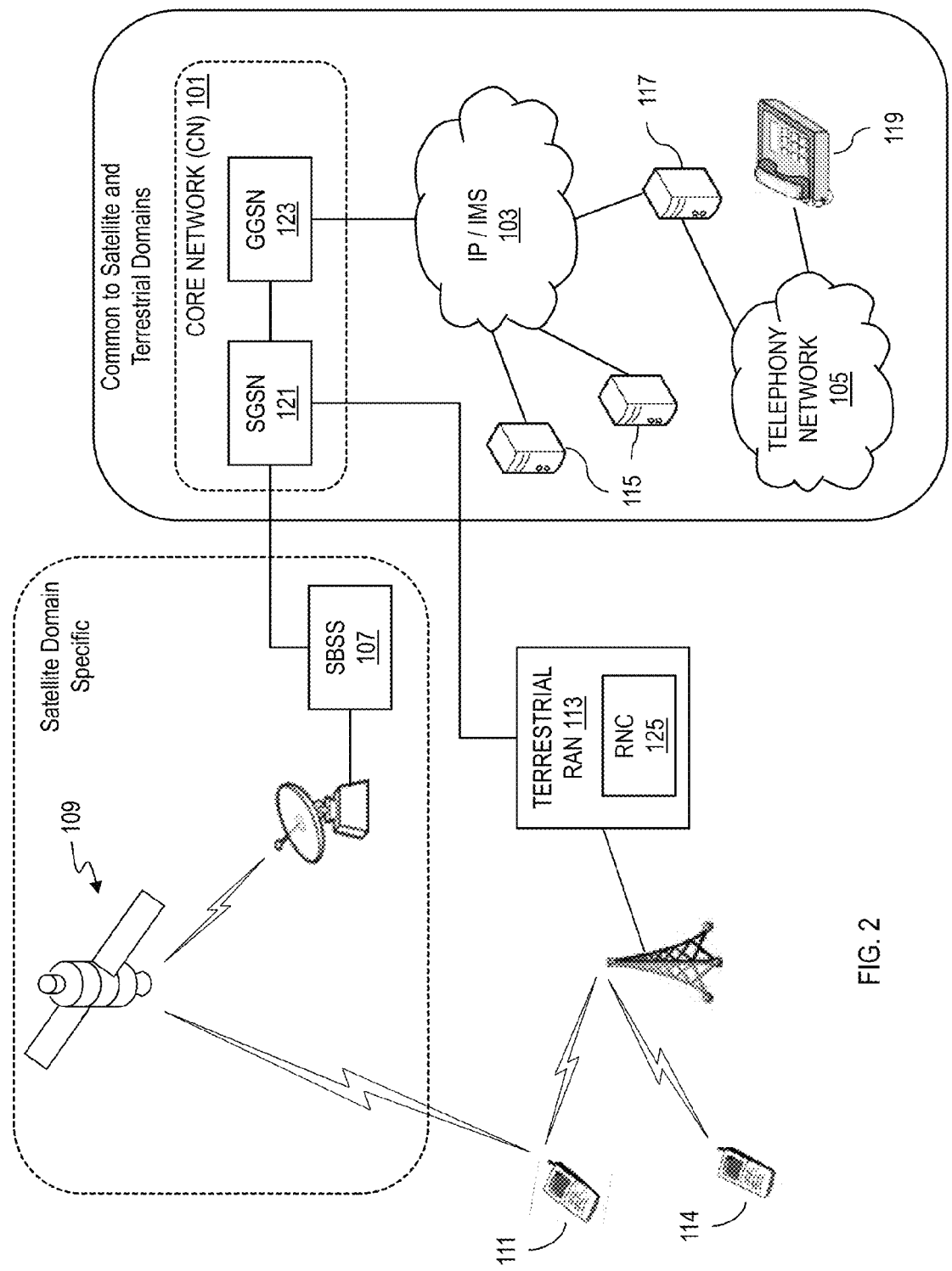

FIGS. 1 and 2 illustrate diagrams of communications systems capable of providing Internet Protocol (IP)-based communications sessions from a terrestrial (wireline or wireless) domain to a satellite domain, according to various exemplary embodiments. For the purposes of illustration, a system 100 of FIG. 1 supports multimedia services using an Internet Protocol (IP) architecture, such that end-to-end communications sessions are packetized. By way of example, a terrestrial core network (CN) 101 is a wireless core network that is compliant with a Third Generation (3G) or Fourth Generation (4G) architecture; e.g., Third Generation Partnership Project (3GPP)-based. For example, the system 100 can utilize a satellite air interface denoted as GMR-1 3G, which is an evolution of the GMR-1 air interface standards; GMR-1 3G has been adopted as a mobile satellite system standard by the European Telecommunications Standards Institute (ETSI) and the International Telecommunications Union (ITU). The wireless core network 101 may also have connectivity to a data network 103 and a telephony network 105.

Networks 101, 103, and 105 may be any suitable wireline and/or wireless network. For example, telephony network 105 may include a circuit-switched network, such as the public switched telephone network (PSTN), an integrated services digital network (ISDN), a private branch exchange (PBX), an automotive telematics network, or other like network. Wireless network 101 (e.g., cellular system) may employ various technologies including, for example, code division multiple access (CDMA), enhanced data rates for global evolution (EDGE), general packet radio service (GPRS), global system for mobile communications (GSM), IP multimedia subsystem (IMS), universal mobile telecommunications system (UMTS), etc., as well as any other suitable wireless medium, e.g., microwave access (WiMAX), wireless fidelity (WiFi), satellite, and the like. Moreover, data network 103 may be any local area network (LAN), metropolitan area network (MAN), wide area network (WAN), the Internet, or any other suitable packet-switched network, such as a commercially owned, proprietary packet-switched network having voice over Internet Protocol (VoIP) capabilities, e.g., a proprietary cable or fiber-optic network.

Within the satellite domain, a satellite base station subsystem (SBSS) 107 is introduced that implements the necessary modifications and enhancements for efficient operation over a satellite 109 to one or more user terminals 111a-111n. These terminals 111a-111n can be of various types with different form factors and transmit capabilities; e.g., sleek hand-held terminals, personal digital assistants (PDAs), vehicular terminals, portable terminals, fixed terminals, automotive telematics terminals, etc.

The SBSS 107 communicates with the wireless network 101, which includes a core network (e.g., 3G/4G) that is unchanged from terrestrial core network. This consequently permits operators to reuse existing 3G/4G core network elements. The interface between the SBSS 107 and the 3G/4G core network 101 can be a standard terrestrial interface. Again, a 3G network interfaces with the 3G/4G CN 101 to transmit IP packets to external networks such as the internet. The CN 101 includes a Serving GPRS Support Node (SGSN) 121 and a Gateway GPRS Support Node (GGSN) 123. The SGSN 121 is generally operable to transfer data packets to and from UT 111 within its geographical area. Some of the non-limiting functions of SGSN 121 include packet routing and transfer, authentication and charging functions of GPRS mobiles, mobility management and logical link management. A location register of the SGSN 121 stores location information (for example, current cell, current Visitor Location Register) and user profiles of all GPRS users registered with the SGSN 121. The GGSN 123 is responsible for sending user packets to external IP based networks and routing packets back to the mobile user. GGSN 123 is operable to convert GPRS packets coming from SGSN 121 into the appropriate Packet Data Protocol (PDP) format and sends them out to corresponding packet data network. GGSN 123 has several functions, including packet inspection for detecting different types for traffic, which can be used for shaping the traffic under different network load conditions. GGSN 123 keeps a record of active mobile users attached to SGSN 121. GGSN 122 is also responsible for policy control, billing and assigning IP addresses to mobile users. When GGSN 123 receives data addressed to a specific user routed through the CN 101, it checks if the user is active. For example, if UT 111 is active, GGSN 123 forwards the data to SGSN 121, and if UT 111 is not active, the data are discarded.

It is also noted that the architecture of the system 100 permits the same core network element to simultaneously communicate with a terrestrial base station (not shown) and the SBSS 107. This capability is illustrated in FIG. 2. As seen, the system 100 enables handover procedures between terrestrial base-station and the SBSS 107 to be executed via a core network 101 with standard procedures defined in terrestrial systems. In this example, the UT 111 has the capability to communicate over a satellite link or directly communicate with a terrestrial radio access network (RAN) 113 to the wireless core network (CN) 101. The RAN 113 comprises a radio network controller (RNC) 125, which is responsible for the radio resource management functions and certain mobility management functions of the network. By way of example, the data network 103 is configured as an IP/IMS (IP Multimedia Subsystem) with multiple application servers 115 supplying multimedia content. The data network 103 couples to the PSTN 105 via a media gateway 117; the PSTN 105 can serve one or more voice terminals 119.

In the system 100, a radio access bearer (RAB) is associated with Packet Data Protocol (PDP) context maintained between the user terminal (UT) 111 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT 111 and the S-BSS 107 necessary to satisfy, for example, Quality of Service (QoS) requirements of the SIP call signaling and Voice over IP (VoIP) user plane RABs. The signaling radio bearer supports signaling connectivity between the UT 111 and the satellite radio access network.

SIP protocol is typically used for establishing the initiation, and the management, of a session. A SIP message mainly contains three sections detailing the session, timing and media descriptions. A Packet Data Protocol (PDP) context is created for each session initiated, which contains the desired characteristics of the specific session, including the PDP type and the demanded QoS among other parameters. A PDP context can be viewed as a set of information maintained by UT, GGSN and SGSN. It contains a PDP type that identifies the type of Packet Data Network (PDN), the PDP address, QoS information and other session information. Activating a PDP context refers to creating the PDP context at the UT, SGSN and GGSN so that UT can communicate with an entity in PDN using the PDP address maintained in the PDP context. Further, a secondary PDP context activation allows the subscriber to establish a PDP context with a different QoS profile to the same PDN.

While specific reference will be made thereto, it is contemplated that system 100 may embody many forms and include multiple and/or alternative components and facilities.

The Core Network (CN) 101 may include a Proxy-Call Session Control Function (P-CSCF), a Serving-Call Session Control Function (S-CSCF), an Interrogating-Call Session Control Function (I-CSCF), a Media Resource Function Controller (MRFC), a Media Resource Function Processor (MRFP), a Media Gateway (MGW), a Media Gateway Controller Function (MGCF) and a Signaling Gateway (SGW). Note that these components are the components that relate to Session Initiation Protocol (SIP). For other applications, however, the CN 101 may include different components. Additionally, all such components associated with SIP signaling are known in the art, and thus are not shown in the Figures and their functionality is not discussed in detail herein.

Figure 3:
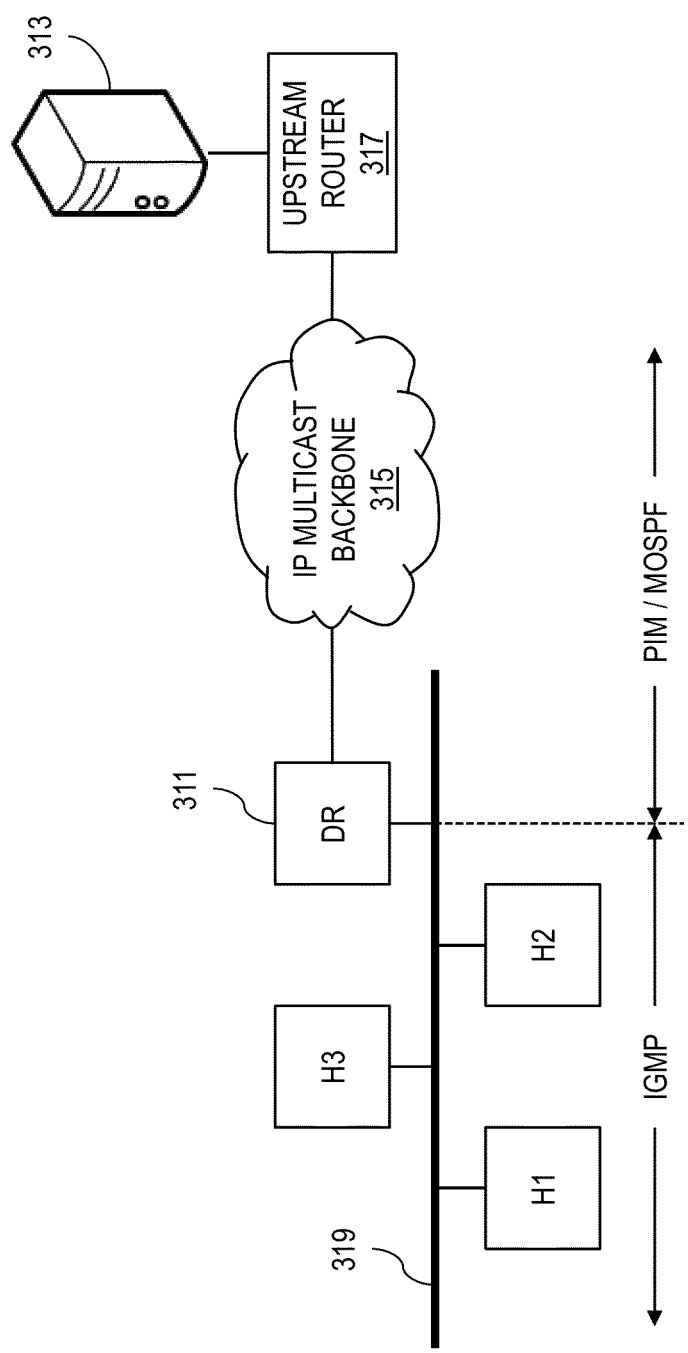
FIG. 3 illustrates an IP Multicast architecture of a wire-line LAN network.

An IP Multicast service is a point to multipoint service, where hosts join an IP multicast session by using host-router protocols, such as Internet Group Management Protocol (IGMP). FIG. 3 illustrates an IP Multicast architecture of a wire-line LAN network. In such a network, IGMP protocol may be used between a number of hosts H1, H2 and H3, and a multicast aware router (sometimes referred to as Designated Router (DR)) 311, located in the local sub-network. The DR 311 joins the multicast distribution tree via router-router protocols (e.g., Protocol Independent Multicast (PIM) and Multicast Open Shortest Path First (MOSPF)). A multicast content server (MCS) 313 can then send multicast transmissions, via the IP multicast backbone 315, to the DR 311. In IPv4, for example, class DIP addresses 224.0.0.0 to 239.255.255.255 are used for multicast addressing, where a given multicast session uses one of these Class D addresses for a multicast session. Hosts (e.g., H1, H2, H3) wishing to join the multicast session use the corresponding Class D address via IGMP protocol. The MCS 313 transmits the multicast session IP packets, using a Class D destination IP address corresponding to the IP Multicast session. Via a router-router multicast protocol, the DR 311 alerts the upstream router 317 that the downstream hosts H1, H2, H3 are participating in the multicast session, identified by the respective Class D IP address. The upstream router 317 then forwards a copy of the multicast session IP packets to the DR 311, and the DR 311 broadcasts the IP packet on the broadcast LAN infrastructure 319 to the hosts H1, H2, H3 using a multicast address.

Figure 4A:
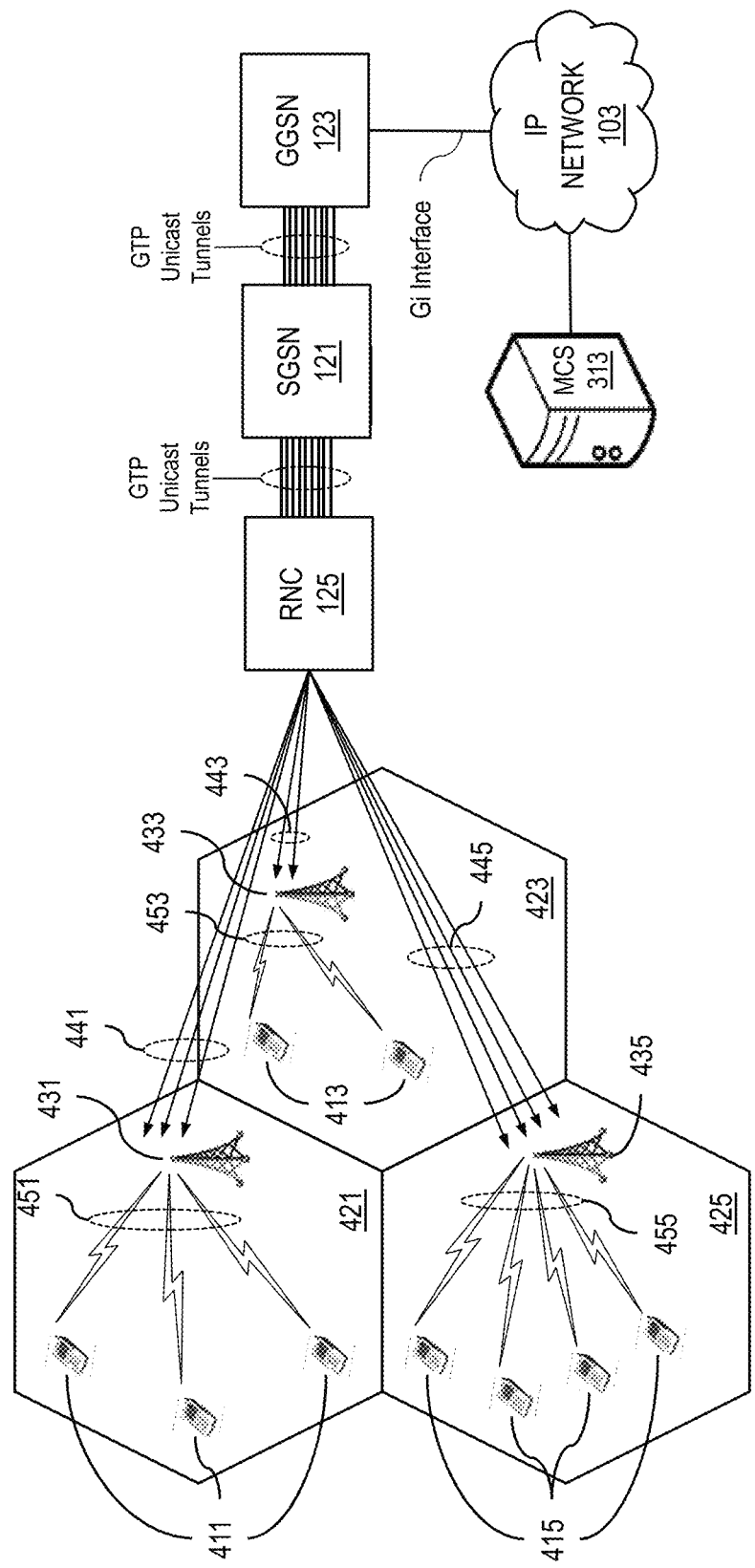
FIG. 4A illustrates the unicast architecture of a wireless metropolitan area network (MAN) or wide area network (WAN)

FIG. 4A illustrates a unicast architecture of a wireless metropolitan area network (MAN) or wide area network (WAN). Further, virtually all 3G wireless networks, for example, are deployed with a unicast infrastructure, such as the architecture illustrated in FIG. 4A. Accordingly, under a unicast framework, for a multicast session, each packet of the multicast session would have to be transmitted individually to each participating host via a wireless link (e.g., in a unicast or point to point manner). Accordingly, such a multicast session would utilize as many radio resources as there are hosts participating in the multicast session (one radio resource for unicast transmissions to each participating host). This can consume a lot of radio resources if there are a lot of hosts that join a multicast session. With reference to FIG. 4A, for example, three hosts 411 in cell 421, two hosts 413 in cell 423, and four hosts 415 in cell 425 are all participating in a multicast session. In view of the unicast infrastructure, each packet of the session must be unicast to the respective radio towers 431, 433, 435 of the cells 421, 423, 425—via the three unicast streams 441 to the radio tower 431, the two unicast streams 443 to the radio tower 433, and the four unicast streams 445 to the radio tower 435, respectively. The packets are then transmitted to each of the participating hosts via a separate radio resource for each host—via the three radio resources 451 to the hosts 411, the two radio resources 453 to the hosts 413, and the four radio resources 455 to the hosts 415, respectively.

Figure 4B:
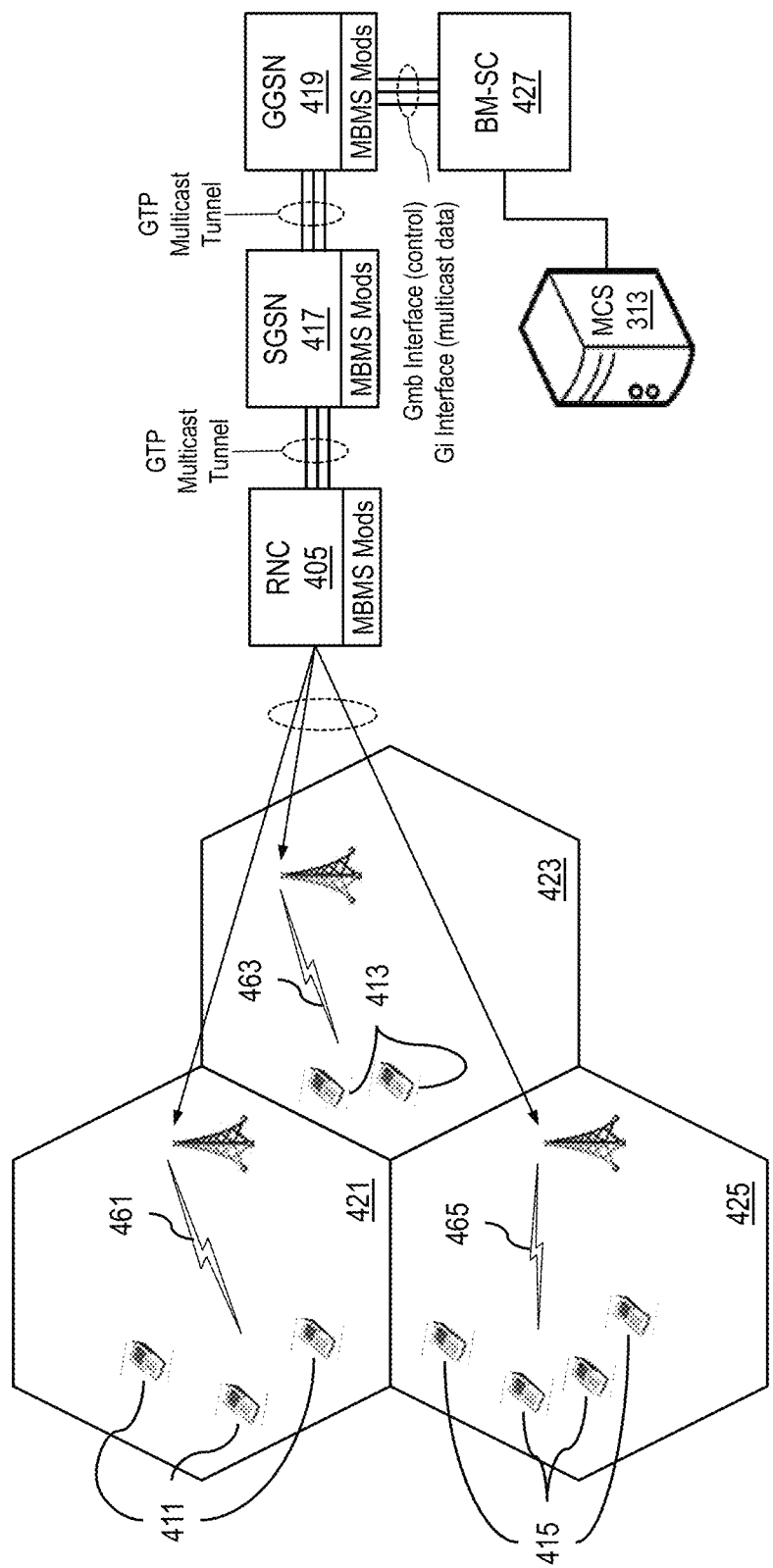
FIG. 4B illustrates a unicast architecture of a wireless MAN or WAN of FIG. 4A, with the deployment of the Mobile Broadcast and Multicast Service (MBMS) protocol.
Figure 4C:
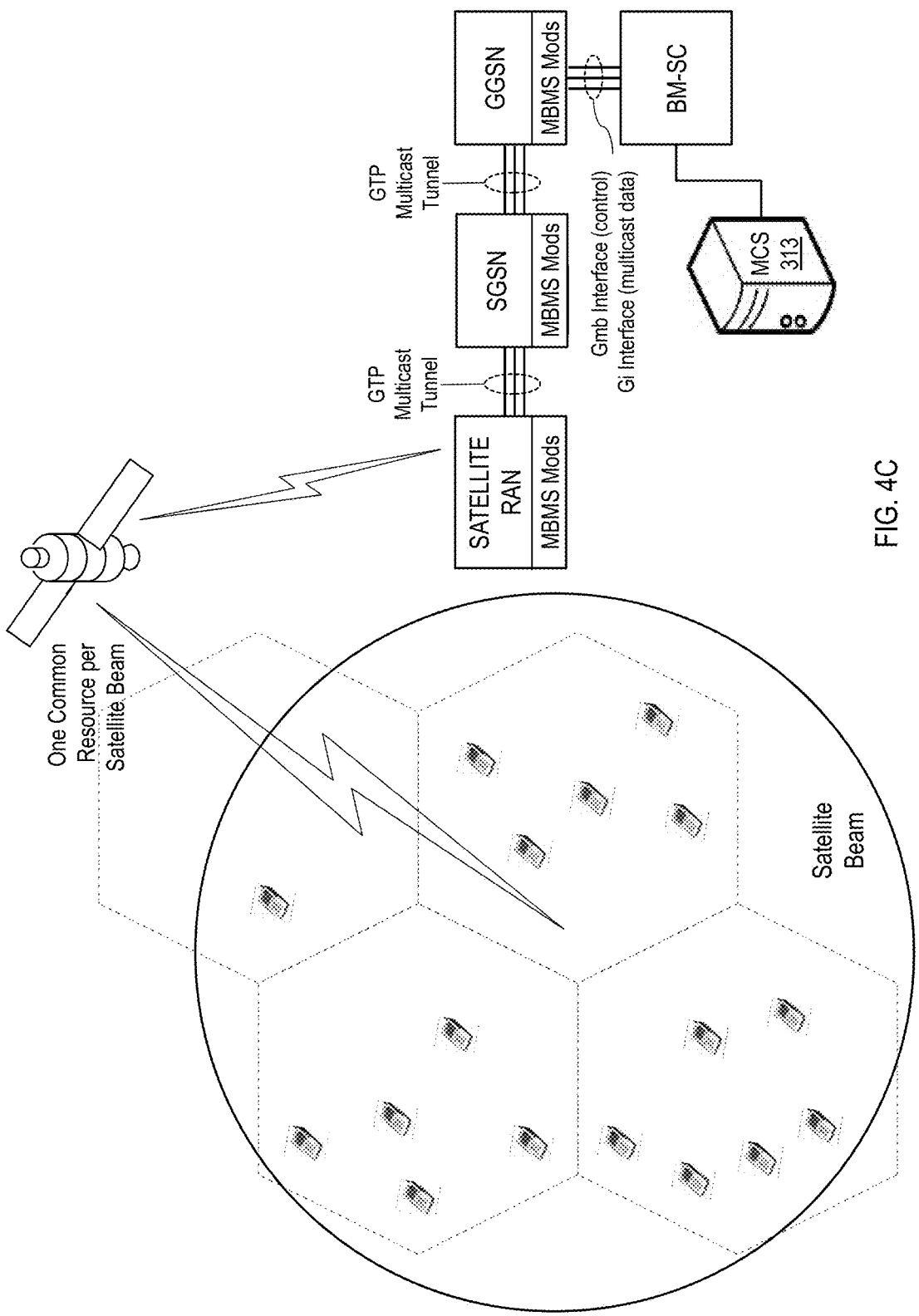
FIG. 4C illustrates an architecture of a mobile satellite system (MSS), with the deployment of the FIG. 4C illustrates the architecture of a mobile satellite system (MSS), with the deployment of the MBMS protocol (MBMS) protocol.

In order to conserve radio resources, a protocol called Mobile Broadcast and Multicast Service (MBMS) has been introduced for terrestrial wireless standards. FIG. 4B illustrates a unicast architecture of a wireless MAN or WAN of FIG. 4A, with the deployment of the MBMS protocol. With reference to FIG. 4B, for example, each of the hosts 411, 413, 415 signifies its participation in a particular multicast session to the SGSN 417 (via the RNC 405), which informs the GGSN 419 of the respective hosts' participation. The GGSN 419, in turn, informs the Broadcast-Multicast Service Center (BM-SC) 427, via the Gmb control interface, which comprises a newly defined interface specific to the MBMS protocol. This control signaling of the MBMS protocol facilitates the transmission of the multicast session data packets via a single radio resource in each cell—via radio resource 461 in cell 421, radio resource 463 in cell 423, and radio resource 465 in cell 425. Accordingly, significant efficiency gains are achieved through the use of fewer radio resources. Moreover, similar efficiency gains can be achieved through the deployment of the MBMS protocol in a mobile satellite system. For example, FIG. 4C illustrates an architecture of a mobile satellite system (MSS), with the deployment of the MBMS protocol. As illustrated in FIG. 4C, in a spot-beam MSS, because a satellite spot-beam is typically much larger than a terrestrial cell, the efficiencies gained by utilizing a single transmission resource are significantly higher than in a terrestrial system—a single satellite transmission resource covers a significantly larger number of potential participating hosts.

Deployment of the MBMS protocol in either a terrestrial mobile network or a satellite mobile system, however, requires the deployment of certain MBMS specific modifications to the core network elements, such as the SGSN and GGSN, which would require a significant amount of money, resources and time in view of the vast amount of deployed 3G core network elements already deployed in the field. Further, not only are modifications required for such core network elements themselves, but interface modifications between the core network elements would also be required. Additionally, the MBMS protocol further requires modifications to the non-access stratum (NAS) protocols in the hosts terminals or user terminals (UTs). Accordingly, multi-vendor selection would be limited to only those that provide equipment supporting the MBMS protocol. Moreover, the MBMS protocol lacks any provisions for supporting wireless hosts with private IP addresses, and would require new billing interfaces and functionality for multicast services.

Exemplary embodiments of the present invention provide for system architectures and methods for secure IP multicast services in terrestrial wireless and satellite mobile communications systems. In accordance with one such exemplary embodiment, the radio access network (RAN) of a mobile wireless communications system employs a protocol for radio access bearer (RAB) binding that facilitates the generation and maintenance of group membership records for a particular multicast session, and the tracking multicast session host participants on a per cell basis. In accordance with a further exemplary embodiment, the RAN employs protocols for encapsulation of multicast control plane messaging from terminal hosts, and for de-encapsulation of multicast data plane streams from a multicast content server (MCS). In accordance with yet a further exemplary embodiment, a multicast gateway (MCG) is provided that employs protocols for de-encapsulation of multicast control plane messaging from terminal hosts, and for de-encapsulation of multicast data plane streams from the MCS. Such encapsulation and de-encapsulation protocols of the RAN, and the introduction of the MCG and associated encapsulation and de-encapsulation protocols, facilitate standard network address and port translation (NAPT) functions employed within the core networks of mobile wireless communications systems, support of private IP addressing for hosts participating in a multicast session over a public IP network, standard multicast tree construction, and the broadcast of multicast data streams via a single radio transmission or satellite channel transmission resource to each cell in which one or more host participants reside. In accordance with further exemplary embodiments, security protocols are provided whereby a shared key for securing the data of a multicast session is provided to participating hosts over the wireless channels in a secure unicast manner. In accordance with additional exemplary embodiments, protocols are provided for optimal designation of physical layer attributes for the wireless transmission channels of a multicast session based on periodic channel quality feedback from the participating hosts. Accordingly, these and other aspects of exemplary embodiments of the present invention facilitate the efficient utilization of radio and spectral resources for multicast services in terrestrial wireless or satellite mobile communications systems.

Accordingly, exemplary embodiments of the present invention provide system architectures and methods for secure IP multicast services in terrestrial wireless and satellite mobile communications systems, for example, which achieve the following advantages: (1) the system architectures and methods would be compatible with the vast amount of 3G commercial off-the-shelf core network elements, and would not require the modification of deployed 3G core network infrastructure and interfaces (e.g., Serving GPRS Support Nodes (SGSN) and Gateway GPRS Support Nodes (GGSN)); (2) the system architectures and methods would be compatible with existing user terminal (UT) Non-Access Stratum (NAS) protocols; (3) the system architectures and methods provides solutions to generic IP multicast services, including operator specific multicast services; (4) the system architectures and methods support private IP addressing for wireless hosts; and (5) the system architectures and methods would not require new billing interfaces or functionality for multicast services. More specifically, the system architectures and methods of exemplary embodiments would be compatible with the protocols and interfaces of existing standard 3G core network infrastructure elements—such as the standard GPRS tunneling protocols employed by 3G SGSNs and GGSNs and the standard NAPT functionality of 3G GGSNs. Accordingly, the standard UT NAS protocol stacks could also operate in multicast session services provided in accordance with exemplary embodiments. For example, as specified in further detail below, the UT indicates its intent to join an IP multicast session using standard IGMP protocol messaging to a multicast gateway (MCG) (which performs the functions of a Designated Router (DR), as in a standard wire-line multicast session, in addition to vast functionality beyond that of a standard DR), which is deployed outside of GGSN with an interface compatible with the standard interface of the GGSN (e.g., the standard Gi interface).

Figure 5:
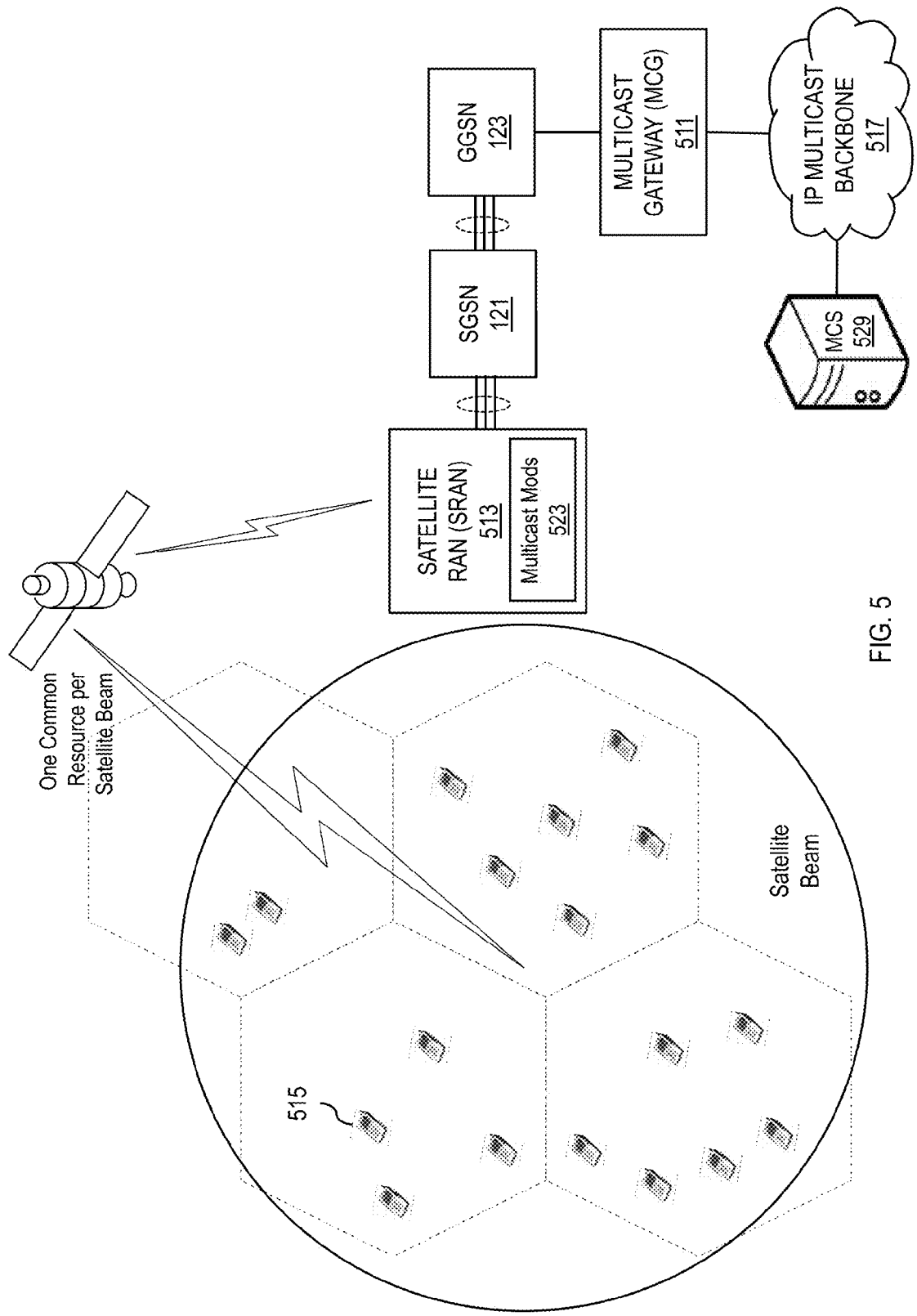
FIG. 5 illustrates an example architecture of a mobile satellite system (MSS), with the deployment of multicast equipment and protocols for resource efficient IP multicast services, in accordance with exemplary embodiments.

FIG. 5 illustrates an example architecture of a mobile satellite system (MSS), with the deployment of multicast equipment and protocols for resource efficient IP multicast services, in accordance with exemplary embodiments of the present invention.

In accordance with an exemplary embodiment, the multicast gateway (MCG) 511 receives IGMP messages that are encapsulated in a transport layer packet. The encapsulation of the packets is performed by the Satellite Base Station Subsystem or Satellite Radio Access Network (Satellite RAN or SRAN) 513, and serves to accommodate private IP addressing as well as unicasting. For example, when a host or user terminal (e.g., UT 515), with a private IP address, sends an IGMP message to the MCG 511, the message header specifies the UT 515 private IP address as the source address and the IP address of MCG 511 as the destination IP address. Then, a Network Address Port Translation (NAPT) function would typically be utilized to translate the [private IP address, source transmission control protocol (TCP)/user datagram protocol (UDP) port] to a [public IP address, modified source TCP/UDP port]. IGMP, however, is an IP layer protocol, and therefore does not have a transport layer header. Accordingly, because the IGMP packet is an IP layer protocol packet, there is no source TCP/UDP port. A NAPT device thus would be unable to perform the address/port translation, and hence, in the event that the MCG 511 resides in a public network, the packet would not be routable in that public network. In accordance with an exemplary embodiment, therefore, the IGMP message from the host (e.g., UT 515) is encapsulated in a UDP transport layer packet by the SRAN 513 and sent towards the MCG 511. Any NAPT device between the SRAN 513 and the MCG 511 would thereby be able to map the private IP address of the UT host and the UDP port number of the tunnel to a public IP address and a modified UDP port. Accordingly, the NAPT device would create a pin-hole for packets arriving from the network (e.g., IP multicast backbone 517) for the UT 515.

As would be evident to one of skill in the art, while certain of the exemplary embodiments described herein are presented in the context of certain protocols, but the concepts of such exemplary embodiments need not be restricted to only those described protocols. For example, certain exemplary embodiments are presented herein with respect to systems that employ UDP/IP and GTP encapsulation/tunneling protocols. The concepts of such exemplary embodiments, however, can similarly be applied to systems that employ other protocols, for example, in the core network. The system architectures and methods of such alternate exemplary embodiments need only provide transmission/signaling protocols that are compatible with the protocols of such existing systems in a manner similarly supporting the existing functionality and interfaces (as with the exemplary embodiments described herein with respect to standard 3G mobile wireless communications systems).

Figure 6:
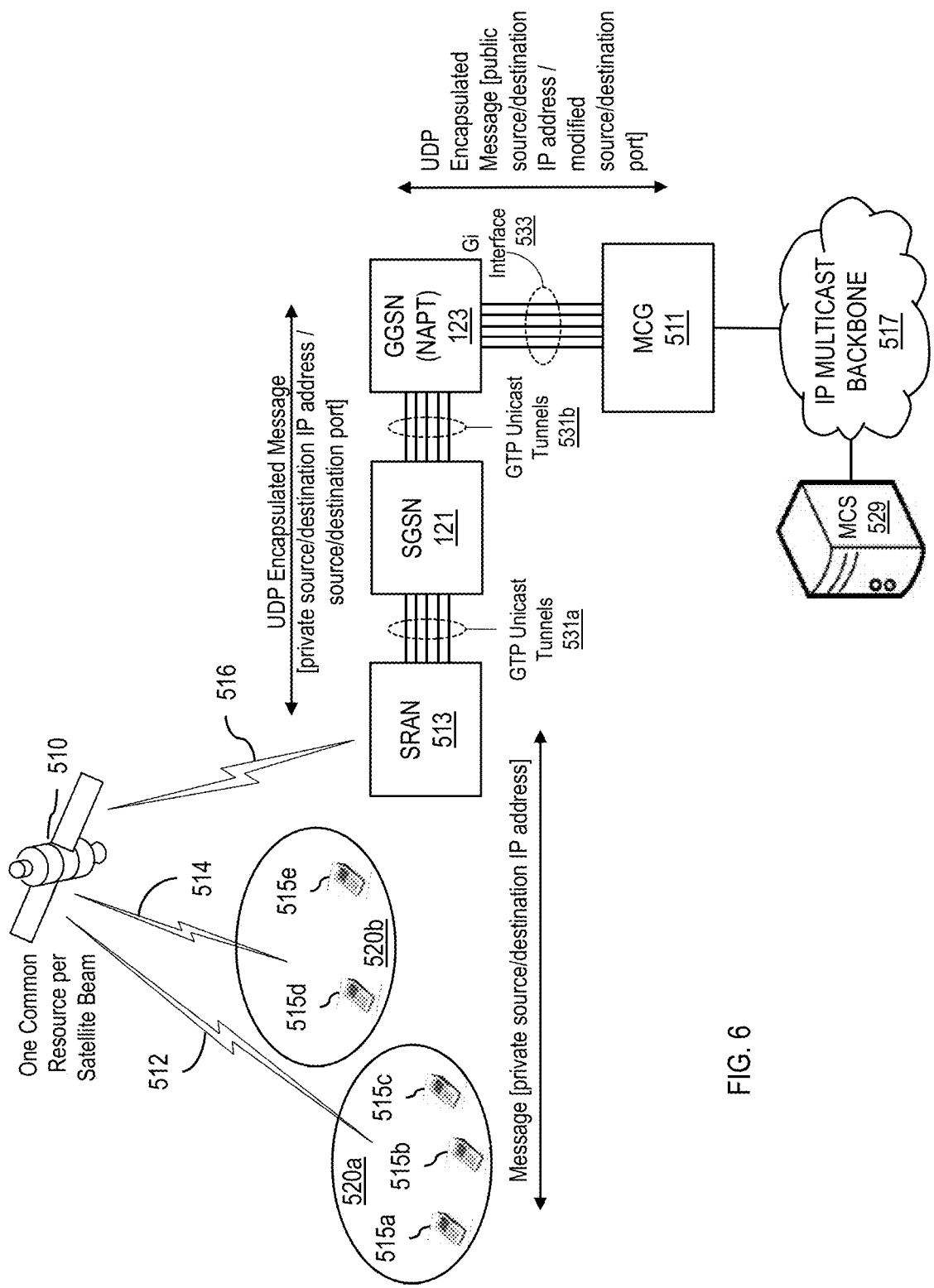
FIG. 6 illustrates an example Network Address Port Translation (NAPT) function for IP multicast messaging between a user terminal or host and an IP data network for resource efficient IP multicast services, in accordance with an exemplary embodiment.

FIG. 6 illustrates an example Network Address Port Translation (NAPT) function for IP multicast messaging between a user terminal or host and an IP data network for resource efficient IP multicast services, in accordance with an exemplary embodiment. By way of example, the following outlines the flow for transmissions in the direction from a host (e.g., UT 515a) to a remote data network (e.g., MCS 529, via IP multicast backbone network 517). For example, in the case of an IGMP Join message, signifying that the UT 515a (located in satellite beam or cell 520a) desires to participate in a particular multicast session, the UT 515a transmits the message as IP packet(s), via the satellite transmission channel 512 to the satellite 510, and the satellite 510 transmits the IP packet(s), via the satellite transmission channel 516, to the SRAN 513. The data content of the IP packet(s) of the IGMP Join message identifies the particular multicast session (in which the UT wishes to participate) via an IP address assigned to the session, e.g., by the multicast operator. For example, the designated multicast session IP address may be transmitted to the UT via multicast application-specific signaling between the UT and the multicast content server, such as a multicast session announcement protocol implemented at the web-site of the operator, which may be triggered upon the selection of an associated link at the web-site. The IP packet(s) of the IGMP message specify the private IP address of the UT 515a as the source IP address of the packet(s).

The SRAN 513 then encapsulates the packet(s) as UDP/IP packet(s), in accordance with the UDP transport layer protocol (e.g., as specified in the IETF publication RFC 768). The UDP/IP encapsulated packets specify the private IP address of the UT 515a as the source IP address and a UDP source port assigned by the SRAN 513 as the source port, and the IP address of the MCG 511 as the destination IP address and a designated port monitored by the MCG 511 as the destination port. According to one exemplary embodiment, the SRAN 513 assigns the source port to the UDP/IP encapsulated packets based on a prior radio access bearer (RAB) binding process between the UT 515*a* and the SRAN 513 (described in further detail below with reference to FIG. 8). The SRAN 513 also maintains a record of the particular source ports associated with the respective private IP addresses of the respective host UTs for the particular multicast session (e.g., identified by its multicast group ID (MGID) or designated multicast session IP address). The SRAN 513 further encapsulates the UDP packets for transmission (through the SGSN 121) to the GGSN 123, via the GTP unicast tunnels 531*a,* 531*b.* This further encapsulation is configured in accordance with the GPRS Tunneling Protocol (GTP) (specifically the GTP-U protocol used for carrying user data within the GPRS Core Network and between the SRAN 513 and the core network), for example, as specified in the 3GPP Standard TS 29.060.

The GGSN 123 de-encapsulates the GTP-U encapsulation to acquire the UDP encapsulated packet, and (via NAPT functionality) converts the private source IP address to a public source IP address and converts the source port to a modified source port, where the public IP address represents a public IP address assigned to the multicast content server operator, and the source port effectively represents a participant in a particular multicast session. Accordingly, because the port indicator is 16 bits, the UDP encapsulation of an IGMP Join message from a private IP source address facilitates the mapping of each private IP address, as a participant in the multicast session, to a port of a single IP address of an operator—facilitating the mapping of up to $2^{16}$ or 65,536 participating private IP sources to $2^{16}$ ports/unicast sessions of a single private IP address. The network address and port conversions carried out by the GGSN 123 are performed in accordance with the IP Network Address Translator (NAT) functions (e.g., as specified in the IETF publication RFC 2663). The GGSN then transmits the recovered UDP packets (with the public source IP address and modified port) to the MCG 511, via the Gi Interface 533.

The context of the UDP encapsulation is between the SRAN 513 and the MCG 511, in that the 511 maintains the responsibility to de-encapsulate the UDP tunneled IP packet and interpret the IGMP message. Further, the MCG 511 keeps track of the user terminals that are participating in a particular IP multicast session, and replicates the downstream multicast IP packets for each of the participating user terminals for unicast transmissions through the core network to the SRAN. Accordingly, this UDP tunneling between the SRAN 513 and the MCG 511 is unlike typical DR functionality, where (with the typical DR functionality) the IGMP messages do not have to be de-encapsulated. Moreover, with the typical DR functionality, the DR only needs to know if there is at least one host on the LAN participating in a multicast session. In accordance with exemplary embodiments of the present invention, however, the MCG tunnels the downstream IP multicast packets as unicast packets, specifying a destination IP address as the NAPT translated public IP address and a destination port as the NAPT modified UDP port. Given that the NAPT device (e.g., the GGSN) has already created a binding or a pin-hole for this [IP address, port] combination, the NAPT device will then translate the tunnel address to the private IP address of the host and the UDP port that was created by base station (e.g., the SRAN) at the time of encapsulating the original IGMP message (e.g., the IGMP Join Message).

Continuing with reference to FIG. 6, by way of further example, the following outlines the flow for transmissions in the direction from the MCS 529 (e.g., via IP multicast backbone network 517) to a host (e.g., UT 515*a*). For example, in the case of the transmission of a multicast data stream, the MCS 529 formats the data packets as a multicast UDP/IP packet data stream, where the packets specify the IP address of the MCS 529 as the source IP address and the port for the multicast session as the source port, and specify the IP address of the multicast session as the destination IP address and the port of the multicast session as the destination port. The multicast data packets are transmitted to the MCG 511.

The MCG 511 replicates and encapsulates the packets for transmission via an individual unicast UDP/IP tunnel for each participating host, and transmits the individual unicast UDP/IP packet streams to the GGSN 123. In the case of the UT 515*a*, for example, the multicast data stream packets are encapsulated by the MCG 511 based on the source IP address and port comprising the IP address of the MCG 511 and the port monitored by the MCG 511, and the destination IP address and port comprising the public IP address of the operator and the respective modified source port (in other words, the same public IP address and respective modified source port into which the NAPT function of the GGSN 123 converted the private IP address and assigned source port of the UT 515*a* in the case of the upstream IGMP Join message packet(s) from the UT 515*a*). The GGSN 123, via its NAPT function, converts the public destination IP address to the associated private IP address of the respective UT and the destination port to the associated destination port assigned by the SRAN 513 for the respective upstream IGMP message packet(s). Further, as with the SRAN 513 in the upstream direction for the IGMP messages, the GGSN 123 encapsulates each individual unicast UDP/IP packet stream in accordance with the GTP-U protocol for transmission through the SGSN 121 to the SRAN 513. The SRAN 513 de-encapsulates the GTP-U encapsulation of each individual GTP unicast tunnel to obtain the underlying UDP encapsulated multicast data packets of the respective individual unicast UDP/IP stream. Based, in part, on the private IP address and assigned port specified by the UDP encapsulation of each individual unicast UDP/IP data stream, and the records maintained from the IGMP Join message process, the SRAN 513 is able to determine the participating UTs in each satellite beam or cell, and transmits the multicast data to each such satellite beam. The multicast data is transmitted to each such satellite cell via a single transmission channel. For example, in the case of the UT 515*a*, the SRAN 513 transmits the multicast data via the single uplink channel 516 to the satellite and downlink channel 512 to the satellite cell 520*a*.

By way of further example, FIG. 7A illustrates example data flows of the IP multicast control plane for resource efficient IP multicast services, in accordance with an exemplary embodiment. For example, the five hosts (UTs 515*a,* 515*b,* 515*c,* 515*d,* 515*e*), three in satellite spot beam 520*a* and two in spot beam 520*b* desire to participate in a multicast session. For this example, the five UTs 515*a,* 515*b,* 515*c,* 515*d,* 515*e* have the respective allocated private IP addresses of 10.5.2.100, 10.5.2.101, 10.5.2.102, 10.5.3.100, 10.5.3.101, and the multicast session has been allocated a Class D IP address of 224.0.1.2. Each UT generates and transmits an IGMP Join message to the SRAN 513 (via the respective satellite transmission channels 512, 514, 516 (shown in FIG. 7A as the signal arrows from the respective UTs to the SRAN). Each IGMP Join message specifies the multicast session 224.0.1.2 as the session being joined. The SRAN 513 encapsulates each IGMP Join message as UDP packet, configured as follows: (1) the source IP address being set as the Private IP address of the respective UT; (2) a respective source port number (which for this example are 7697, 9865, 7653, 7954 and 5782, respectively); (3) the destination IP address being set as that of the MCG 511 (which for this example is 165.2.3.4); and (4) a pre-defined destination port that the MCG monitors (which for this example is 5432). Again, the context of this UDP encapsulation is between the SRAN 513 and the MCG 511, which is designated by the tunnel 711 in FIG. 7A.

Accordingly, the UDP encapsulation (by the SRAN 513) of the IGMP Join messages from the five UTs is as follows:

| UT | Source IP Address | Source Port | Destination IP Address | Destination Port |
|---|---|---|---|---|
| 515a | 10.5.2.100 | 7697 | 165.2.3.4 | 5432 |
| 515b | 10.5.2.101 | 9865 | 165.2.3.4 | 5432 |
| 515c | 10.5.2.102 | 7653 | 165.2.3.4 | 5432 |
| 515d | 10.5.3.100 | 7954 | 165.2.3.4 | 5432 |
| 515e | 10.5.3.101 | 5782 | 165.2.3.4 | 5432 |

The SRAN 513 further encapsulates the IGMP Join Message UDP packets for transmission (through the SGSN 121) to the GGSN 123, via the GTP unicast tunnels 531*a*, 531*b*. Again, this further encapsulation is configured in accordance with the GTP-U protocol used for carrying user data within the GPRS Core Network (as specified in the 3GPP Standard TS 29.060). Further, the SGSN 121 actually de-encapsulates the GTP-U protocol and re-encapsulates the packets (also using the GTP-U protocol), before transmission to the GGSN 123—however, this de-encapsulation and re-encapsulation is performed in accordance with the respective guidelines of the standard, and is effectively irrelevant to the exemplary embodiments of the present invention, as described herein. The GTP-U encapsulation is designated by the tunnel 721 in FIG. 7A.

The GGSN 123 de-encapsulates the GTP-U encapsulation to acquire the UDP encapsulated packets. Then, via a NAPT function, the GGSN 123 converts the private source IP address for each IGMP Join message packet to a single public IP address, such as a public IP address assigned to the multicast operator (which for this example is 160.5.2.1), and converts the source ports to five different respective modified source ports (which for this example are 2345, 2346, 2347, 2348, 2349, respectively). By way of example, the MCG 511 is controlled by the multicast operator, and the operator thereby controls the port assignments or mapping to the respective UDP ports assigned to the participating UTs (via the encapsulation by the SRAN 513). The GGSN then transmits the recovered UDP packets (with the converted public source IP address and modified ports) to the MCG 511, via the Gi Interface 533. Accordingly, for the present example, the GGSN 123 converts the private source IP addresses and source ports of the received UDP packets, as follows (note, the destination IP address and destination port remain the same):

Upon receipt of the first IGMP Join message, the MCG 123 grafts itself to the multicast distribution tree associated with the respective multicast session, whose root is the multicast content server (MCS) 529 (alternatively, the multicast session root may be a rendezvous point or other multicast content source). Once the MCG 123 has grafted itself to the multicast tree, the particular data packets of the multicast will be transmitted to the MCG 123 via associated routing of the packet stream based on the multicast tree. The construction of the multicast tree may be accomplished via different processes, which would be known to those of skill in the art, and are thus not described in detail herein. By way of example, the multicast tree construction may be via any one of the family of Protocol Independent Multicast (PIM) multicast routing protocols. PIM comprises a family of multicast routing protocols for Internet Protocol (IP) networks, such as LAN, WAN or the Internet—such as PIM Sparse Mode (PIM-SM) protocol, PIM Dense Mode (PIM-DM) protocol, Bidirectional PIM, and PIM Source-Specific Multicast (PIM-SSM) protocol. For example, according to the PIM-SM, unidirectional shared trees (rooted at a rendezvous point per group) are explicitly built, and shortest-path trees per source are optionally created. PIM-SM, for example, is described in further detail in the IETF publication RFC 4601. According to the PIM-DM, shortest-path trees are implicitly built, and branches of the tree are pruned where no receivers are present. PIM-DM, for example, is described in further detail in IETF publication RFC 3973. According to bidirectional PIM, shared bi-directional trees are explicitly built. Bidirectional PIM, for example, is described in further detail in IETF publication RFC 5015. According to PIM-SSM, trees are built that are rooted in just one source. PIM-SSM, for example, is described in further detail in IETF publication RFC 3569.

Figure 7B:
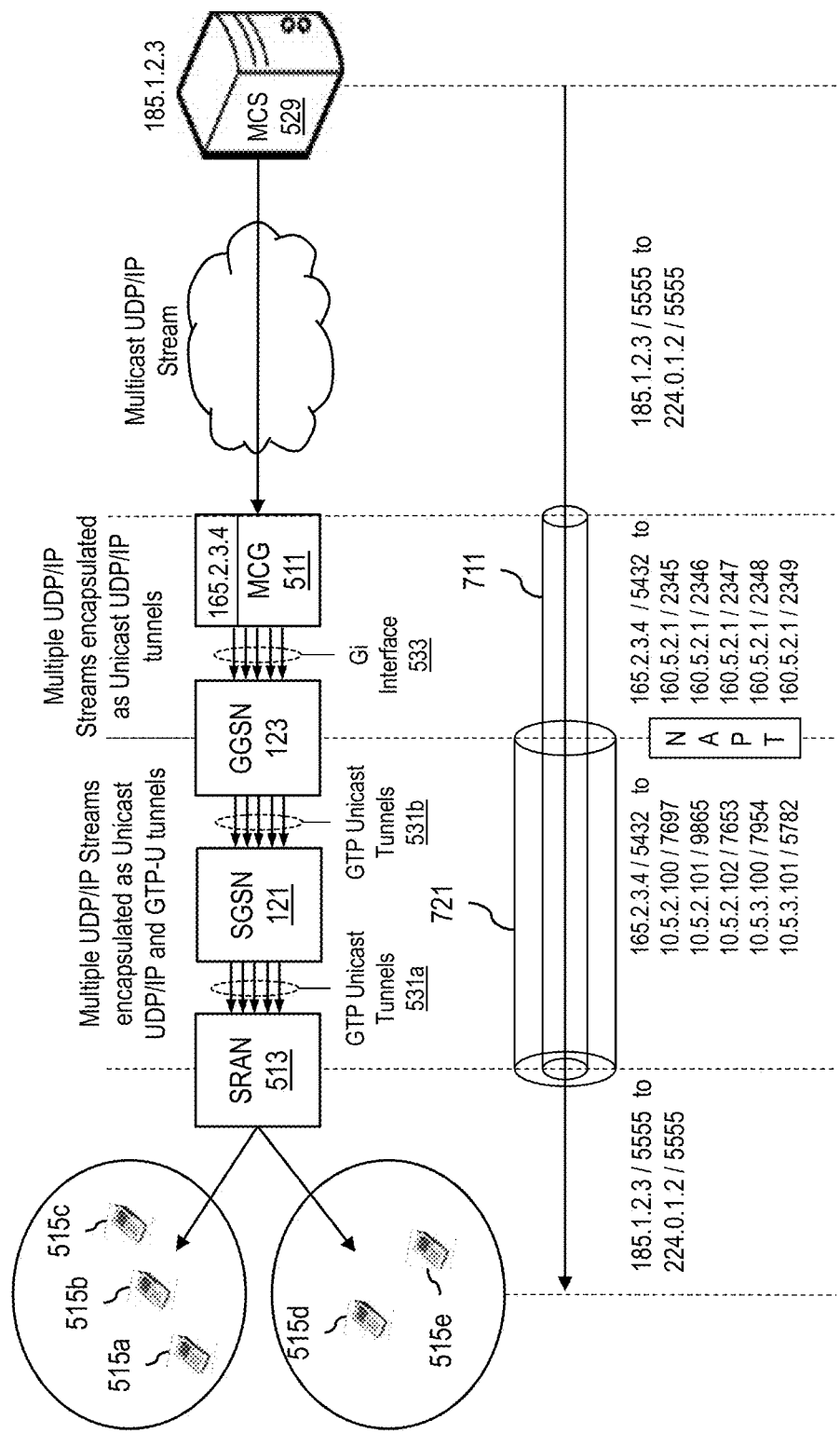
FIG. 7B illustrates example data flows of the IP multicast data plane for resource efficient IP multicast services, in accordance with an exemplary embodiment.

By way of further example, FIG. 7B illustrates example data flows of the IP multicast data plane for resource efficient IP multicast services, in accordance with an exemplary embodiment. For example, the MCS 529 transmits a UDP/IP data stream of a multicast session in which the five hosts (UTs 515*a*, 515*b*, 515*c*, 515*d*, 515*e*) are participating. The MCS 529 transmits the multicast data stream as UDP/IP packets to the MCG 511, where the source address and port comprise the IP address of the MCS 529 (e.g., 185.1.2.3) and a port designated for the multicast session (e.g., 5555), and the destination IP address and port comprise the IP address assigned to the multicast session (e.g., 224.0.1.2) and the port designated for the multicast session (e.g., 5555). For example, the port designated for the multicast session may be assigned by the multicast operator, whereby the operator may host multiple multicast sessions for a single multicast IP address via separate port designations. The MGC 511, in turn, replicates the packets of the multicast data stream, encapsulates the packets as an individual UDP/IP stream or tunnel for each participating UT, and transmits the individual UDP IP streams to the GGSN 123. The individual UDP/IP streams are encapsulated based on the source IP address and port comprising the IP address of the MCG 511 and the port monitored by the MCG

| UT | Source Private IP Address | Source Port | NAPT | Source Public IP Address | Modified Source Port | Destination IP Address | Destination Port |
|---|---|---|---|---|---|---|---|
| 515a | 10.5.2.100 | 7697 | → | 160.5.2.1 | 2345 | 165.2.3.4 | 5432 |
| 515b | 10.5.2.101 | 9865 | → | 160.5.2.1 | 2346 | 165.2.3.4 | 5432 |
| 515c | 10.5.2.102 | 7653 | → | 160.5.2.1 | 2347 | 165.2.3.4 | 5432 |
| 515d | 10.5.3.100 | 7954 | → | 160.5.2.1 | 2348 | 165.2.3.4 | 5432 |
| 515e | 10.5.3.101 | 5782 | → | 160.5.2.1 | 2349 | 165.2.3.4 | 5432 |

511 (e.g., 165.2.3.4/5432), and the destination IP address and port comprising the public IP address of the operator and the respective modified source port (in other words, the same public IP address and respective modified source port into which the NAPT function of the GGSN 123 converted the private IP address and assigned source port of the UT 515a in the case of the upstream IGMP Join message packet(s) from the UT 515a). Specifically, for this example, the individual UDP/IP streams are encapsulated as follows:

| UT | Source IP Address | Source Port | Destination Public IP Address | "Modified" Destination Port |
|---|---|---|---|---|
| 515a | 165.2.3.4 | 5432 | 160.5.2.1 | 2345 |
| 515b | 165.2.3.4 | 5432 | 160.5.2.1 | 2346 |
| 515c | 165.2.3.4 | 5432 | 160.5.2.1 | 2347 |
| 515d | 165.2.3.4 | 5432 | 160.5.2.1 | 2348 |
| 515e | 165.2.3.4 | 5432 | 160.5.2.1 | 2349 |

The GGSN 123, via a NAPT function, then converts the public destination IP address and "modified" destination port for each individual UDP/IP stream to the private IP address for each respective UT and the respective port assigned by the SRAN 513 pursuant to the IGMP Join process. Also, the GGSN 123 further encapsulates each individual UDP/IP stream using the GTP-U protocol for transmission through the SGSN 121 to the SRAN 513. According to one exemplary embodiment, the GGSN knows which particular GTP Unicast tunnel through which the transmit a respective multicast stream from the MCG 511, based on a secondary UDP context established between the respective UT and the CN 101/GGSN 123 (described in further detail below with reference to FIG. 8). Specifically, for this example, the public destination IP address and destination port for each individual UDP/IP stream are converted as follows (note, the source IP address and source port remain the same):

| UT | Source IP Address | Source Port | Destination Public IP Address | "Modified" Destination Port | NAPT | Destination Private IP Address | "Assigned" Source Port |
|---|---|---|---|---|---|---|---|
| 515a | 165.2.3.4 | 5432 | 160.5.2.1 | 2345 | → | 10.5.2.100 | 2345 |
| 515b | 165.2.3.4 | 5432 | 160.5.2.1 | 2346 | → | 10.5.2.101 | 2346 |
| 515c | 165.2.3.4 | 5432 | 160.5.2.1 | 2347 | → | 10.5.2.102 | 2347 |
| 515d | 165.2.3.4 | 5432 | 160.5.2.1 | 2348 | → | 10.5.3.100 | 2348 |
| 515e | 165.2.3.4 | 5432 | 160.5.2.1 | 2349 | → | 10.5.3.101 | 2349 |

The SRAN receives the GTP-U encapsulated individual UDP/IP streams, de-encapsulates the GTP-U encapsulation, and de-encapsulates the unicast UDP/IP encapsulation for each stream. Based on the destination private IP address and "assigned" source port for each stream, the SRAN 513 determines the particular UTs participating in the multicast session. Specifically, based on its records, the SRAN 513 knows that the private IP address/assigned port pairs 10.5.2.100/7697, 10.5.2.101/9865, 10.5.2.102/7653, 10.5.3.100/7954, 10.5.3.101/5782 correspond to a multicast session in which the respective UTs 515a, 515b, 515c, 515d, 515e are participating. The SRAN 513 can then transmit the multicast data packets to the respective satellite cells in which the participating UTs reside, as a single broadcast transmission to each such satellite cell. For example, the multicast packets are transmitted (as a broadcast transmission) to each such satellite cell formatted as the original UDP/IP packets, based on the source IP address and port comprising the MCS 529 IP address and the port designated for the particular multicast session (e.g., 185.1.2.3/5555), and the destination IP address and port comprising the IP address assigned to the multicast session and the port designated for the particular multicast session (e.g., 224.0.1.2/5555). Each participating UT can thereby recognize the packets as being packets of the multicast session in which it is participating based on the IP address and port of the multicast session. Accordingly, the SRAN 513 need only broadcast the multicast data packets via a single transmission to each satellite cell in which at least one participating UT resides.

According to a further exemplary embodiment, when the SRAN 513 receives multiple streams/packets of the same multicast data session, addressed to different hosts participating in the multicast session and residing in a single cell or spot-beam, the SRAN 513 picks only one of the streams and transmits it across the satellite air interface to the respective satellite cell. Accordingly, satellite resource efficiency is achieved while maintaining the standard unicast framework of the core network infrastructure. The SRAN 513 is able to identify packets belonging to the same multicast session based on a radio access bearer (RAB) binding, which is initiated via a RAB binding message transmitted by the UTs to the SRAN 513.

Figure 8:
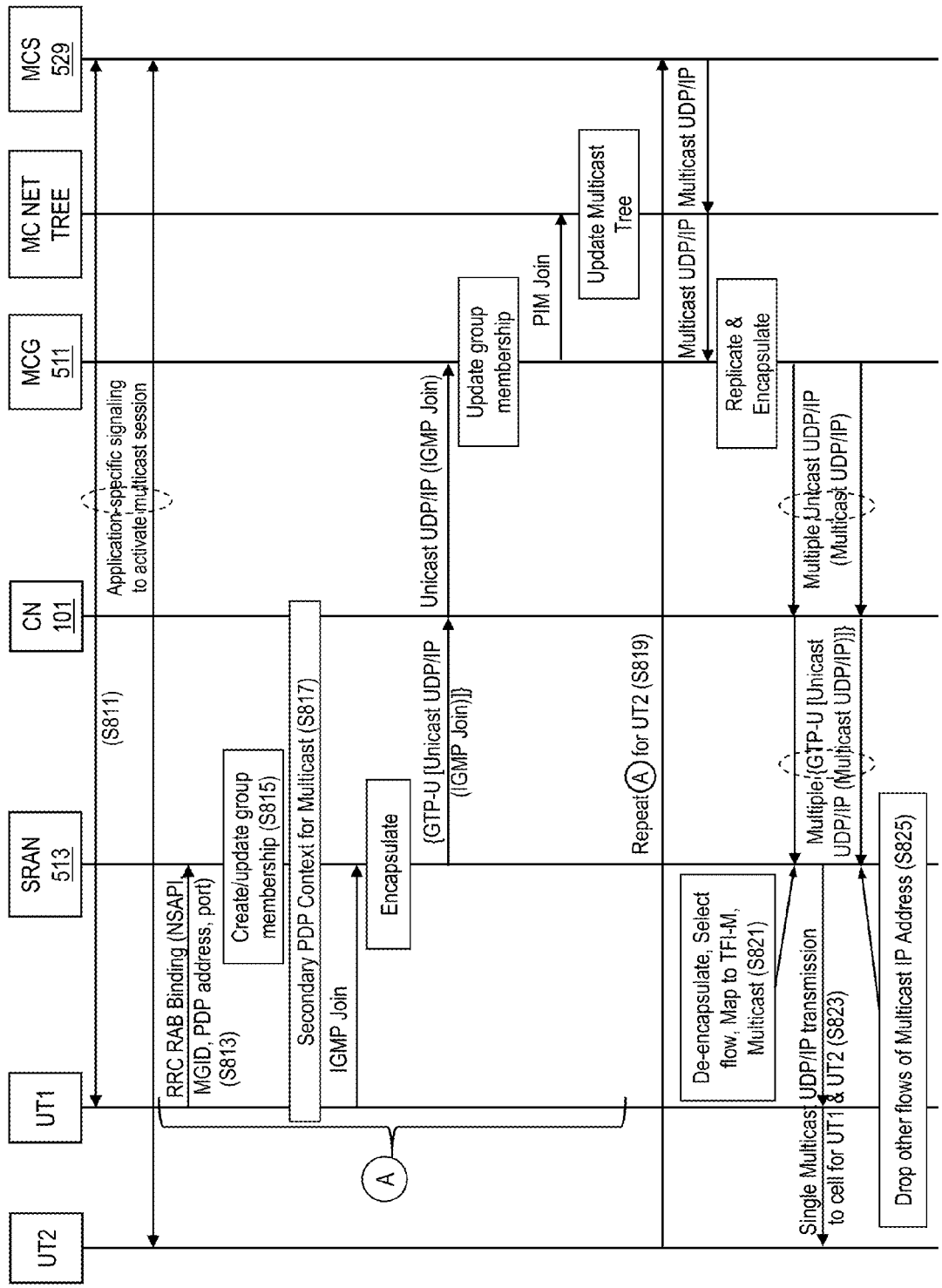
FIG. 8 illustrates an example UT assisted radio access bearer (RAB) binding process for resource efficient IP multicast services, in accordance with an exemplary embodiment.

FIG. 8 illustrates an example UT assisted radio access bearer (RAB) binding process for resource efficient IP multicast services, in accordance with an exemplary embodiment. With respect to the UT 1, for example, once the multicast session has been activated or set up with respect the UT1 (e.g., based on the application-specific signaling between the UT1 and the MCS 529 (S811)), the UT1 sends a radio resource control (RRC) RAB binding message to the SRAN 513 (S813). The RAB binding message informs the SRAN 513 that the UT1 is joining or setting up a particular multicast session (e.g., identified by the multicast group ID or designated multicast IP address). For example, the RAB binding message comprises a network service access point identifier (NSAPI), a multicast group ID (MGID), and PDP address and port (S813). The PDP address and port essentially comprise the IP address of the UT and the assigned/designated port for the UDP encapsulation associated with the particular multicast session (e.g., the UT may arbitrarily select a port number for an ephemeral port). Further, if a UT is participating in two multicast IP sessions, then the UT will select a different ephemeral port number for each session—the PD address will be the same for the UT, but the differing port numbers will distinguish the multicast sessions—and the NAPT function of the GGSN will translate the UT private IP address and source port for one session into a respective public IP address and modified source port for the session, and translate the UT private IP address and source port for the other session into a respective public IP address and modified source port for that session. The same will hold true for further sessions in which the UT may be participating. In the event that the UT is setting up the multicast session (e.g., the UT1 is the first UT to join the session), the SRAN 513 creates a group membership including the UT1 for the particular multicast session of that MGID (S815). Alternatively, if the UT1 is joining a previously set up multicast session, then the SRAN 513 updates the group membership by adding the UT1 to the group for the particular multicast session (S815). Further, the UT1 also communicates the PDP address and port of the RAB binding to the CN 101 via the secondary PDP context process for the multicast session (S817). Similarly, the UT2 will also send a RAB binding message to the SRAN 513 and the SRAN 513 will update the group membership by adding the UT2 to the group for the particular multicast session, and the UT2 also communicates the PDP address and port of the RAB binding to the CN 101 via the secondary PDP context process for the multicast session (S819). Accordingly, each participating UT sends its own RAB binding message to the SRAN 513, according to which the SRAN 513 adds the respective UT to the multicast session group membership (by which the SRAN 513 tracks the particular UTs within each satellite cell participating in the particular multicast session). In that manner, when the SRAN 513 receives the multiple unicast UDP/IP packets of the particular multicast session, based on the RAB binding, the SRAN 513 can determine each satellite cell in which at least one participating UT resides (e.g., the SRAN 513 determines that the two participating UTs (UT1 and UT2) are located within a particular satellite cell), and sends a single broadcast transmission over the air to each such satellite cell for the participating UTs within the cell (S819, S821). Further, the SRAN 513 can drop the unselected unicast streams (S823).

Figure 9:
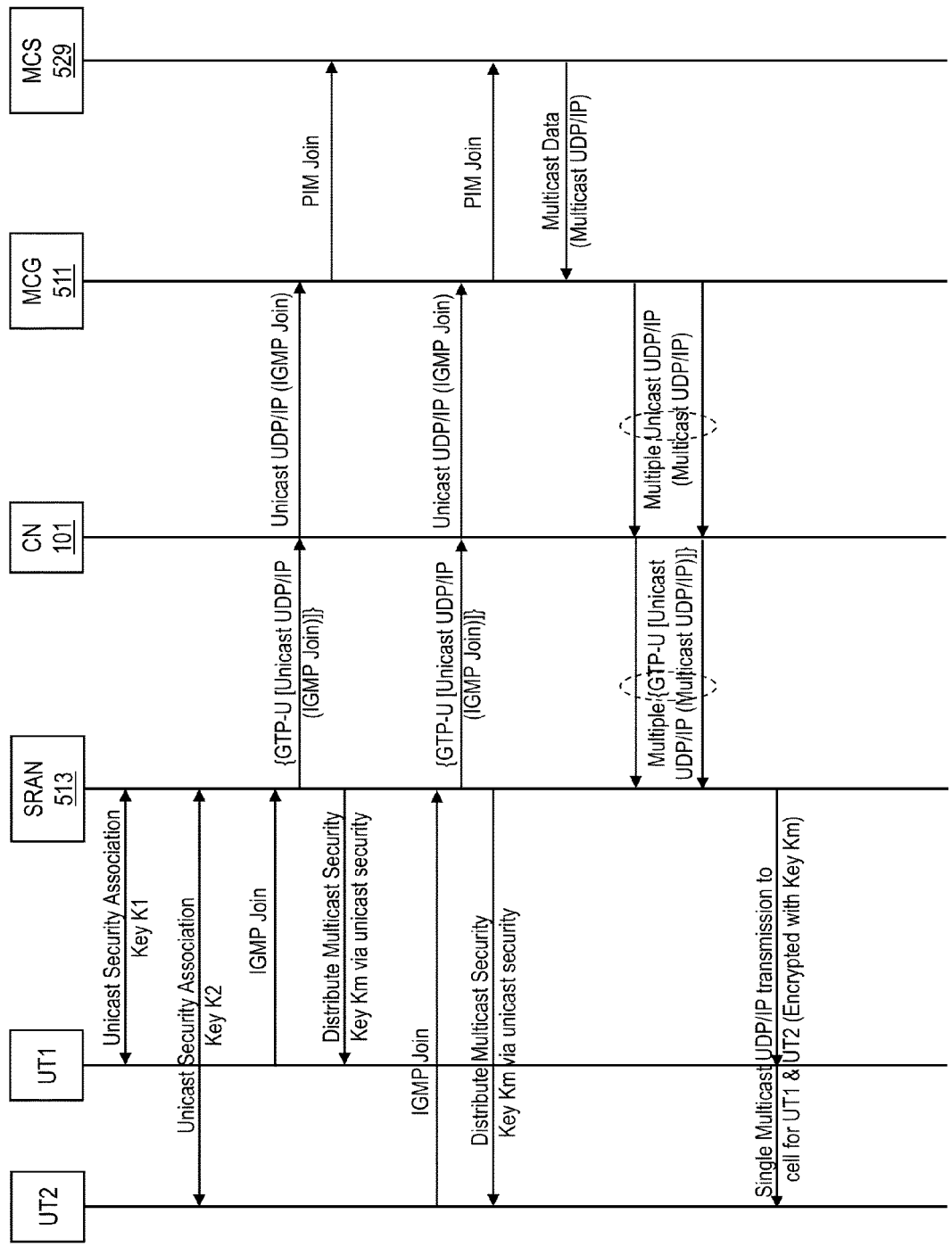
FIG. 9 illustrates example IP multicast security and security key distribution processes for resource efficient IP multicast services, in accordance with an exemplary embodiment.

In accordance with a further exemplary embodiment, with reference to FIG. 9, a security feature is provided between the UT hosts and satellite RAN or SBSS for IP multicast traffic. Given the objective of achieving resource efficiencies by transmitting only one copy of an IP multicast packet in a cell or spot-beam to reach multiple hosts that have joined the same multicast session, it is clear that unicast security cannot be applied to this common packet. According to this exemplary embodiment, therefore, security is achieved by transferring a common key used for a multicast session across air interface in a secure unicast method, and then encrypting the multicast IP packets using the common key. By securely transferring the multicast security keys using unicast security, it becomes as difficult to eaves-drop on multicast traffic as it would be for unicast traffic. FIG. 9 illustrates example IP multicast security and security key distribution processes for resource efficient IP multicast services, in accordance with an exemplary embodiment.

Figure 10:
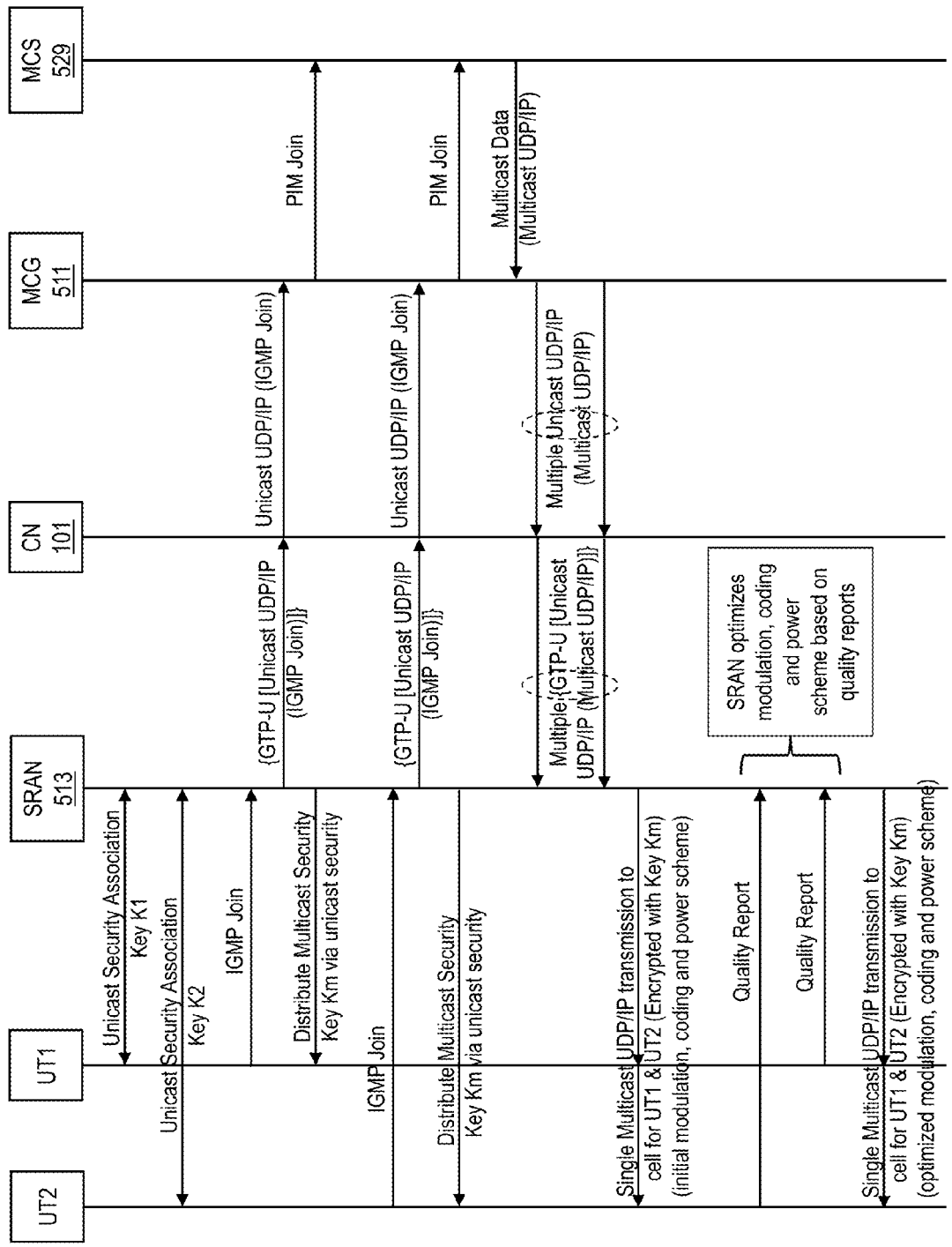
FIG. 10 illustrates an example of a physical layer link adaptation process for resource efficient IP multicast services, in accordance with an exemplary embodiment.

In accordance with yet a further exemplary embodiment, physical layer attributes (e.g., modulation, coding, power etc.) can be optimally chosen or designated in a manner further conserving satellite or radio resources. For example, given the objective of achieving resource efficiencies by transmitting only one copy of the packets of an IP multicast stream to each satellite cell in which participating hosts are located, as is clearly evident, each such transmission must be robust enough to reach the host of the cell that would be the most difficult to reach based on a combination of the configured radio channel capabilities of the host and the radio conditions being experienced by the host among all hosts that are actively listening to the multicast channel in a cell or spot-beam. There can be a variety of different terminal types with different radio capabilities, and furthermore, even hosts with same capability may be in different channel conditions. This can be accomplished based on channel conditions experienced by multicast hosts in various wireless environments. According to the present invention, one simple approach is to choose the most robust modulation and coding scheme and transmit the multicast IP packet with max possible power regardless of the population of users that are actively listening to the multicast channel. Another preferred embodiment is where more optimal use of resource is achieved when the base station keeps track of the population of hosts that have joined the IP multicast session and base station determines modulation and coding scheme, as well as power to reach the worst-case user. Here the hosts provide channel quality feedback periodically to the base station as scheduled by the base station. FIG. 10 illustrates an example of a physical layer link adaptation process for resource efficient IP multicast services, in accordance with an exemplary embodiment.

According to exemplary embodiments of the present invention, methods are also provided for performing cell-to-cell UT handover, while maintaining the resource efficient multicast services as described herein. According to such handover methods, the SRAN determines the need for a handover of a UT from one cell or spot beam to another. When a UT or host, which is participating in a multicast session, is required to be handed over from a source cell to a target cell, the SRAN informs the host of the designated radio resource (carrier frequency, time-slot(s), code, etc.) of the target cell for the multicast session. In one scenario, where a population of hosts (participating in the same multicast session) already reside in the target cell, the SRAN informs the UT being handed over of the existing resource in target cell. In another scenario, where no hosts participating in the multicast session reside in the target cell, the SRAN first creates/designates a radio resource for the multicast session (if available), and then informs the UT of the newly created/designated resource of target cell. With any such radio handover of a UT (participating in a multicast session) from one cell to another, the MCG need not be involved in the handover process, and thus the architecture and functionality of the MCG need not be impacted by a radio handover with respect to UTs participating an a multicast session.

Although the present invention describes resource efficient multicast for satellite systems, the same concept can be applied to any wireless system, be it terrestrial or satellite. The proposed methods are not limited to 3GPP architectures, it can be applied to any other system such as 3GPP2.

Figure 11:
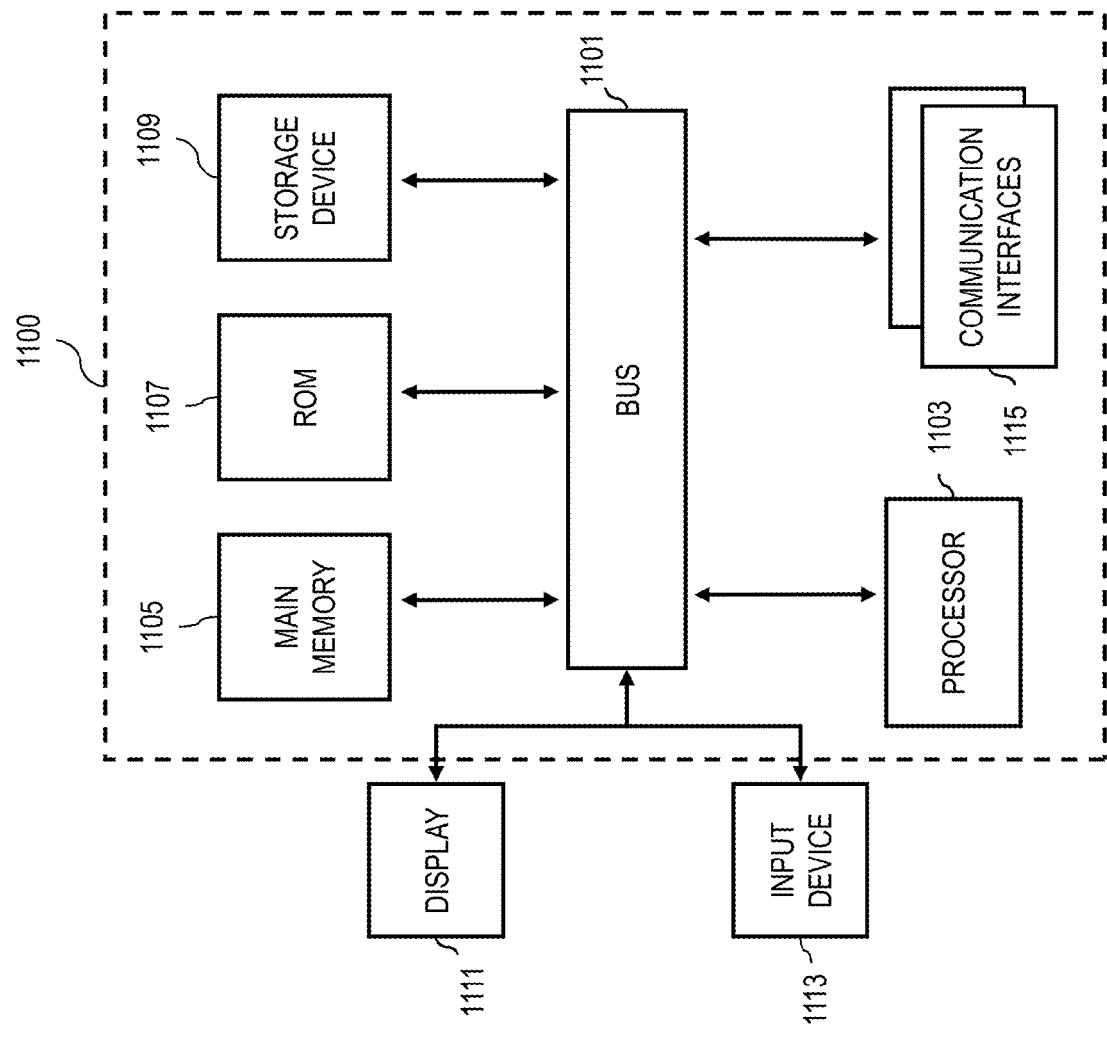
FIG. 11 illustrates a block diagram of hardware that can be used to implement certain exemplary embodiments.

FIG. 11 illustrates a block diagram of exemplary hardware that can be used to implement certain exemplary embodiments. A computing system 1100 includes a bus 1101 or other communications mechanism for communicating information and a processor 1103 coupled to the bus 1101 for processing information. The computing system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computing system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computing system 1100 may be coupled via the bus 1101 to a display 1111, such as a liquid crystal display, or active matrix display, for displaying information to a user. An input device 1113, such as a keyboard including alphanumeric and other keys, may be coupled to the bus 1101 for communicating information and command selections to the processor 1103. The input device 1113 can include a cursor control, such as a mouse, a trackball, or cursor direction keys, for communicating direction information and command selections to the processor 1103 and for controlling cursor movement on the display 1111.

According to various embodiments of the invention, the processes described herein can be provided by the computing system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1100 also includes at least one communications interface 1115 coupled to bus 1101. The communications interface 1115 provides a two-way data communications coupling to a network link (not shown). The communications interface 1115 sends and receives electrical, electromagnetic, or optical signals that carry digital data streams representing various types of information. Further, the communications interface 1115 can include peripheral interface devices, such as a Universal Serial Bus (USB) interface, a PCMCIA (Personal Computer Memory Card International Association) interface, etc.

The processor 1103 may execute the transmitted code while being received and/or store the code in the storage device 1109, or other non-volatile storage for later execution. In this manner, the computing system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
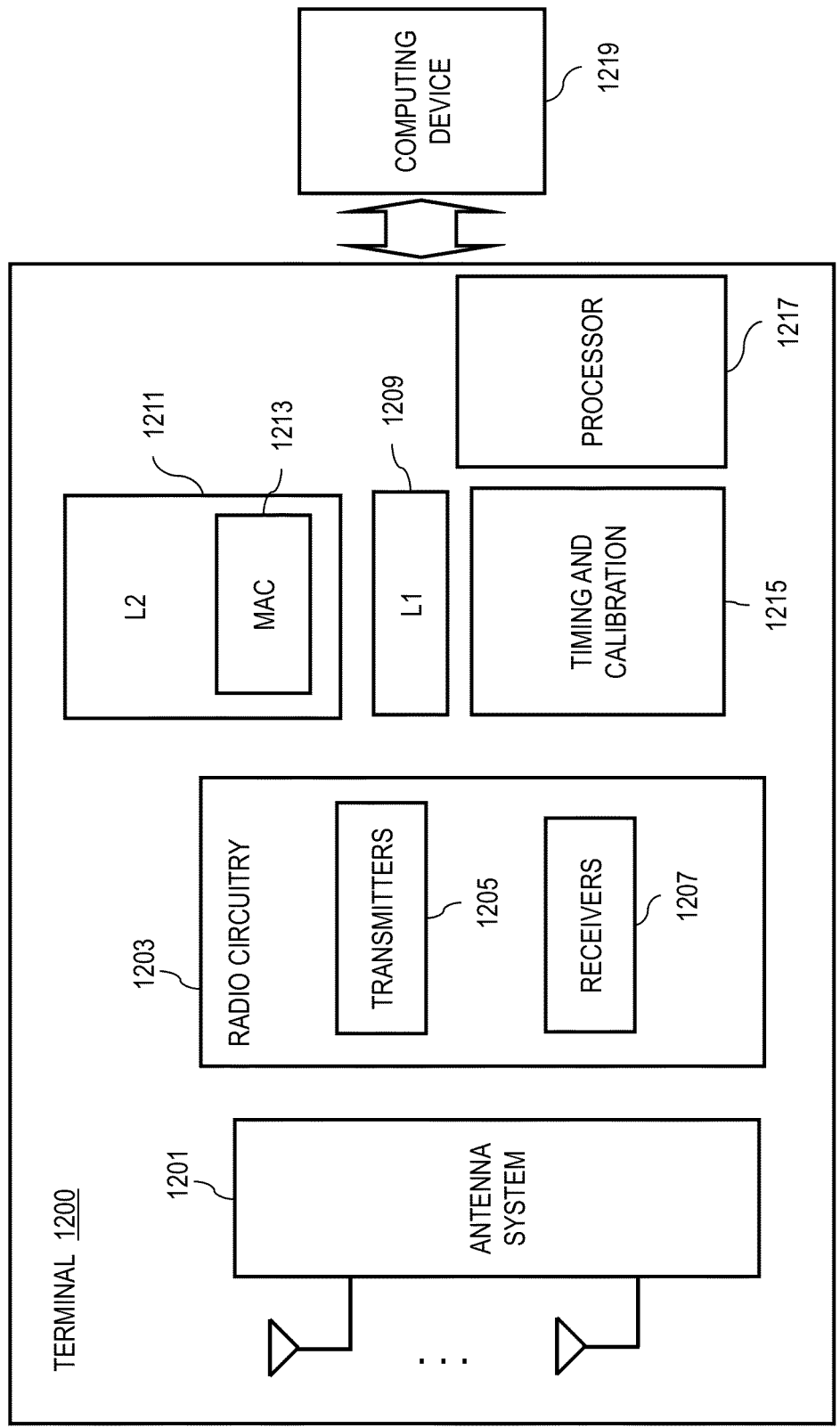
FIG. 12 illustrates a block diagram of exemplary components of a user terminal configured to operate in the systems of FIGS. 1 and 2, according to an exemplary embodiment.

FIG. 12 illustrates a block diagram of exemplary components of a user terminal configured to operate in the systems of FIGS. 1 and 2, according to an exemplary embodiment. A user terminal 1200 includes an antenna system 1201 (which can utilize multiple antennas) to receive and transmit signals. The antenna system 1201 is coupled to radio circuitry 1203, which includes multiple transmitters 1205 and receivers 1207. The radio circuitry encompasses all of the Radio Frequency (RF) circuitry as well as base-band processing circuitry. As shown, layer-1 (L1) and layer-2 (L2) processing are provided by units 1209 and 1211, respectively. Optionally, layer-3 functions can be provided (not shown). Module 1213 executes all Medium Access Control (MAC) layer functions. A timing and calibration module 1215 maintains proper timing by interfacing, for example, an external timing reference (not shown). Additionally, a processor 1217 is included. Under this scenario, the user terminal 1200 communicates with a computing device 1219, which can be a personal computer, work station, a Personal Digital Assistant (PDA), web appliance, cellular phone, etc.

FIG. 13 illustrates a chip set 1300 in which embodiments of the invention may be implemented. Chip set 1300 includes, for instance, processor and memory components described with respect to FIG. 13 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 includes one or more processing cores with each core configured to perform independently. A multi-core processor enables multiprocessing within a single physical package. Examples of a multi-core processor include two, four, eight, or greater numbers of processing cores. Alternatively or in addition, the processor 1303 includes one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, and/or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM) and static memory (e.g., ROM) for storing executable instructions that, when executed by the processor 1303 and/or the DSP 1307 and/or the ASIC 1309, perform the process of exemplary embodiments as described herein. The memory 1305 also stores the data associated with or generated by the execution of the process.

According to the preceding, various exemplary embodiments have been described with reference to the accompanying drawings. The example embodiments, as described above, were chosen and described in order to best explain the principles of the invention and its practical application to thereby enable others skilled in the art to best utilize the invention in various embodiments and with various modifications as are suited to the particular use contemplated. The specification and drawings are accordingly to be regarded in an illustrative rather than restrictive sense. Moreover, it will be evident that various modifications and changes may be made thereto, and additional embodiments may be implemented, without departing from the broader scope of the invention.

What is claimed is:

1. A method comprising:
   receiving, by a wireless gateway of a communications network, a message packet from a host terminal, wherein the message packet is destined for a multicast control node of the communications network, and the message packet includes a multicast session identifier that identifies a multicast session being joined by the host terminal;
   encapsulating the message packet as a transport layer unicast tunnel packet, including at least one source identifier of the host terminal and at least one destination identifier of the multicast control node; and
   transmitting the transport layer unicast tunnel packet to the multicast control node, wherein the transport layer unicast tunnel packet is configured to direct the multicast control node to bind to a multicast distribution tree associated with the multicast session.

2. The method of claim 1, wherein the encapsulation of the message packet as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

3. The method of claim 1, further comprising:
   encapsulating the transport layer unicast tunnel packet as a core network unicast tunnel packet in accordance with a core network tunneling protocol, and, instead of transmitting the transport layer unicast tunnel packet, transmitting the core network unicast tunnel packet to the multicast control node via a core network of the communications network.

4. The method of claim 3, further comprising:
   receiving, by a gateway node of the core network, the core network unicast tunnel packet;
   de-encapsulating the core network unicast tunnel packet encapsulation and translating the transport layer unicast tunnel packet encapsulation by converting the at least one source identifier of the respective host terminal to corresponding translated network identifiers; and
   transmitting, by the gateway node of the core network, the translated transport layer unicast tunnel packet to the multicast control node.

5. The method of claim 4, further comprising:
   receiving, by the multicast control node, the translated transport layer unicast tunnel packet; and
   de-encapsulating the translated transport layer unicast tunnel packet encapsulation, and transmitting the de-encapsulated packet to a multicast server.

6. The method of claim 5, wherein:
   the encapsulation of the message packet as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node;
   the translation of the transport layer unicast tunnel packet encapsulation comprises converting the private IP address of the host terminal to a public IP address of an operator controlling the multicast session, and converting the assigned TCP/UDP port to a modified source port assigned to the respective host terminal for the multicast session.

7. A method comprising:
   receiving, by a multicast control node of a communications network, a multicast control message packet that originated from a host terminal, wherein the multicast control message packet includes a multicast session identifier that identifies a multicast session being joined by the host terminal, and wherein the multicast control message is encapsulated as a transport layer unicast tunnel packet, including at least one source identifier of the host terminal and at least one destination identifier of the multicast control node; and
   upon receipt of the transport layer tunnel packet by the multicast control node, binding the multicast control node to a multicast distribution tree associated with the multicast session.

8. The method of claim 7, further comprising:
   de-encapsulating the transport layer unicast tunnel packet encapsulation, and transmitting the de-encapsulated packet to a multicast server.

9. The method of claim 7, wherein the encapsulation of the multicast control message as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

10. A method comprising:
    receiving, by a multicast control node of a communications network, a multicast data packet of a multicast data stream, wherein the multicast data packet includes session data of a multicast session, at least one source identifier of a multicast server and at least one destination identifier of the multicast session;
    replicating the multicast data packet for transmission as an individual unicast transmission, via a core network of the communications network, to each of a plurality of host terminals participating in the multicast session;

encapsulating each replication of the multicast data packet as a transport layer unicast tunnel packet, including at least one source identifier of the multicast control node and at least one destination identifier of a respective one of the host terminals participating in the multicast session; and transmitting each encapsulated replication packet, via a core network of the communications network, for delivery to the respective host terminal.

11. The method of claim 10, wherein:

the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each replication of the multicast data packet as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

12. The method of claim 10, further comprising:

receiving, by a gateway node of the core network, the encapsulated replication packets;

translating the transport layer unicast tunnel packet encapsulation of each of the received encapsulated replication packets by converting the at least one destination identifier of the respective host terminal to corresponding translated network identifiers;

encapsulating each translated transport layer unicast tunnel packet as a core network unicast tunnel packet in accordance with a core network tunneling protocol; and transmitting each core network unicast tunnel packet, via a core network of the communications network, to a wireless gateway of the communications network for the delivery to the respective host terminal.

13. The method of claim 12, further comprising:

receiving, by the wireless gateway, the core network unicast tunnel packets;

de-encapsulating the core network unicast tunnel packets to obtain the data packet of the multicast data stream, including the session data, the source identifiers of the multicast server and the destination identifiers of the multicast session;

transmitting the de-encapsulated multicast data packet as a wireless broadcast transmission to each of a plurality of wireless coverage cells within which at least one of the host terminals participating in the multicast session is located.

14. The method of claim 13, wherein:

the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each replication of the packet as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

15. A method comprising:

receiving, by a wireless gateway of a communications network, a plurality of encapsulated multicast data packets, wherein each of the multicast data packets comprises a replication of a data packet of a multicast data stream of a multicast session, including at least one source identifier of a multicast server and at least one destination identifier of an associated multicast session; and wherein each of the multicast data packets is encapsulated as a transport layer unicast tunnel packet, including at least one source identifier of a multicast control node of the communications network and at least one destination identifier of a respective one of a plurality of host terminals participating in the multicast session; and de-encapsulating the multicast data packets to obtain the data packet of the multicast data stream, including the session data, the source identifiers of the multicast server and the destination identifiers of the multicast session;

transmitting the de-encapsulated multicast data packet as a wireless broadcast transmission to each of a plurality of wireless coverage cells within which at least one of the host terminals participating in the multicast session is located.

16. The method of claim 15, wherein:

the source identifiers of the multicast server comprise an IP address of the multicast server and a UDP port designated for the multicast session, and the destination identifiers of the associated multicast session comprise an IP address assigned to the multicast session and the UDP port designated for the multicast session; and the encapsulation of each of the multicast data packets as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

17. An apparatus of a communications network, comprising:

a receiver configured to receive wireless communications from remote terminals;

a processor configured to encapsulate a message packet received by the receiver from a host remote terminal, wherein the message packet is destined for a multicast control node of the communications network, and the message packet includes a multicast session identifier that identifies a multicast session being joined by the host remote terminal, and wherein the encapsulation of the message comprises encapsulation as a transport layer unicast tunnel packet, including at least one source identifier of the host terminal and at least one destination identifier of the multicast control node; and a transmitter configured to transmit the transport layer unicast tunnel packet to the multicast control node, wherein the transport layer unicast tunnel packet is configured to direct the multicast control node to bind to a multicast distribution tree associated with the multicast session.

18. The apparatus of claim 17, wherein the encapsulation of the message packet as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

19. The apparatus of claim 17, wherein the processor is further configured to:
encapsulate the transport layer unicast tunnel packet as a core network unicast tunnel packet in accordance with a core network tunneling protocol, wherein, instead of the transport layer unicast tunnel packet, the transmitter is configured to transmit the core network unicast tunnel packet to the multicast control node via a core network of the communications network.

20. An apparatus of a communications network, comprising:
a receiver configured to receive terrestrial communications from a core network of the communications network;
a processor configured to process a multicast control message packet received by the receiver and originating from a host remote terminal, wherein the multicast control message packet includes a multicast session identifier that identifies a multicast session being joined by the host terminal, and wherein the multicast control message is encapsulated as a transport layer unicast tunnel packet, including at least one source identifier of the host terminal and at least one destination identifier of the multicast control node; and
based on the processing of the multicast control message packet, the processor is further configured to bind the apparatus to a multicast distribution tree associated with the multicast session.

21. The apparatus of claim 20, wherein the processor is further configured to de-encapsulate the transport layer unicast tunnel packet encapsulation, and the apparatus further comprises a transmitter configured to transmit the de-encapsulated packet to a multicast server.

22. The apparatus of claim 20, wherein the encapsulation of the multicast control message as a transport layer unicast tunnel packet comprises a UDP encapsulation, wherein the source identifiers of the host terminal comprise a private IP address of the host terminal and a respective assigned TCP/UDP port, and the destination identifiers of the multicast control node comprise an IP address of the multicast control node and a predefined destination UDP port monitored by the multicast control node.

23. An apparatus of a communications network, comprising:
a receiver configured to receive terrestrial communications destined for the communications network;
a processor configured to process a multicast data packet of a multicast data stream received by the receiver, wherein the multicast data packet includes session data of a multicast session, at least one source identifier of a multicast server and at least one destination identifier of the multicast session, wherein the processing of the multicast data packet comprises: replicating the data packet for transmission as an individual unicast transmission, via a core network of the communications network, to each of a plurality of host terminals participating in the multicast session; and encapsulating each replication of the packet as a transport layer unicast tunnel packet, including at least one source identifier of the multicast control node and at least one destination identifier of a respective one of the host terminals participating in the multicast session; and a transmitter configured to transmit each encapsulated replication packet, via a core network of the communications network, for delivery to the respective host terminal.

24. The apparatus of claim 23, wherein:
the source identifiers of the multicast server comprise an IP address of the multicast server and a UDP port designated for the multicast session, and the destination identifiers of the associated multicast session comprise an IP address assigned to the multicast session and the UDP port designated for the multicast session; and
the encapsulation of each replication of the packet as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

25. An apparatus of a communications network, comprising:
a receiver configured to receive terrestrial communications from a core network of the communications network;
a processor configured to process a plurality of multicast data packets received by the receiver from the core network, wherein each of the multicast data packets comprises a replication of a data packet of a multicast data stream of a multicast session, including at least one source identifier of a multicast server and at least one destination identifier of an associated multicast session; and wherein each of the multicast data packets is encapsulated as a transport layer unicast tunnel packet, including at least one source identifier of a multicast control node of the communications network and at least one destination identifier of a respective one of a plurality of host terminals participating in the multicast session, wherein the processing of the multicast data packets comprises de-encapsulating the multicast data packets to obtain the data packet of the multicast data stream, including the session data, the source identifiers of the multicast server and the destination identifiers of the multicast session; and
a wireless transmitter configured to transmit the de-encapsulated multicast data packet as a wireless broadcast transmission to each of a plurality of wireless coverage cells within which at least one of the host terminals participating in the multicast session is located.

26. The apparatus of claim 25, wherein:
the source identifiers of the multicast server comprise an IP address of the multicast server and a UDP port designated for the multicast session, and the destination identifiers of the associated multicast session comprise an IP address assigned to the multicast session and the UDP port designated for the multicast session; and
the encapsulation of each of the multicast data packets as a transport layer unicast tunnel packet comprises a UDP encapsulation, wherein the source identifiers of the multicast control node comprise an IP address of the multicast control node and a predefined UDP port monitored by the multicast control node, and the destination identifiers of the respective host terminal comprises an IP address of the host terminal and a respective assigned TCP/UDP port.

* * * * *